United States Patent
Kudo

(10) Patent No.: US 8,381,232 B2
(45) Date of Patent: Feb. 19, 2013

(54) INFORMATION PROCESSING APPARATUS AND COMPUTER USABLE MEDIUM THEREFOR

(75) Inventor: Yasuhiro Kudo, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1186 days.

(21) Appl. No.: 12/076,574

(22) Filed: Mar. 20, 2008

(65) Prior Publication Data

US 2008/0244618 A1 Oct. 2, 2008

(30) Foreign Application Priority Data

Mar. 30, 2007 (JP) .................................. 2007-095460

(51) Int. Cl.
*G06F 9/54* (2006.01)
(52) U.S. Cl. .......................... 719/318; 710/15
(58) Field of Classification Search .................. None
See application file for complete search history.

(56) References Cited

U.S. PATENT DOCUMENTS

| | | | | |
|---|---|---|---|---|
| 5,925,108 | A * | 7/1999 | Johnson et al. | 719/318 |
| 2003/0009602 | A1 * | 1/2003 | Jacobs et al. | 709/318 |
| 2003/0229691 | A1 * | 12/2003 | Ishimoto | 709/223 |
| 2005/0182843 | A1 | 8/2005 | Reistad et al. | |
| 2008/0012892 | A1 * | 1/2008 | Imoto | 347/19 |

FOREIGN PATENT DOCUMENTS

| | | |
|---|---|---|
| EP | 1 089 189 B1 | 6/2005 |
| EP | 1 679 823 A1 | 7/2006 |
| GB | 2 330 045 A | 4/1999 |
| JP | 2002-222148 | 8/2002 |
| JP | 2005-72834 | 3/2005 |
| JP | 2006-87058 | 3/2006 |

OTHER PUBLICATIONS

R. Herriot, Internet Printing Protocol (IPP): Event Notification and Subscriptions, Mar. 2005, pp. 30-34.*
Japanese Official Action dated Jun. 28, 2011 together with an English language translation from JP 2007-095460.
European Search Report and Search Opinion issued in Patent Application No. 08250716.1-1228 dated on Aug. 6, 2008.

* cited by examiner

*Primary Examiner* — S. Sough
*Assistant Examiner* — Syed Roni
(74) *Attorney, Agent, or Firm* — Scully, Scott, Murphy & Presser, PC

(57) ABSTRACT

An information processing apparatus is provided. The information processing apparatus includes an event detecting unit to detect events, an event notifying information generating unit to generate event notifying information, an event notifying information storage to store the event notifying information in a predetermined arrangement, a client information list storage to store information concerning the client device to which event information concerning each of the events is provided, a notifying unit to provide a piece of the event information corresponding to a first event to the client device, and a judging unit to judge whether the piece of the event information was provided to the client device normally. The notifying unit provides another piece of the event information corresponding to a second event, when the judging unit judges the precedent piece of the event information was provided to the client device normally.

19 Claims, 15 Drawing Sheets

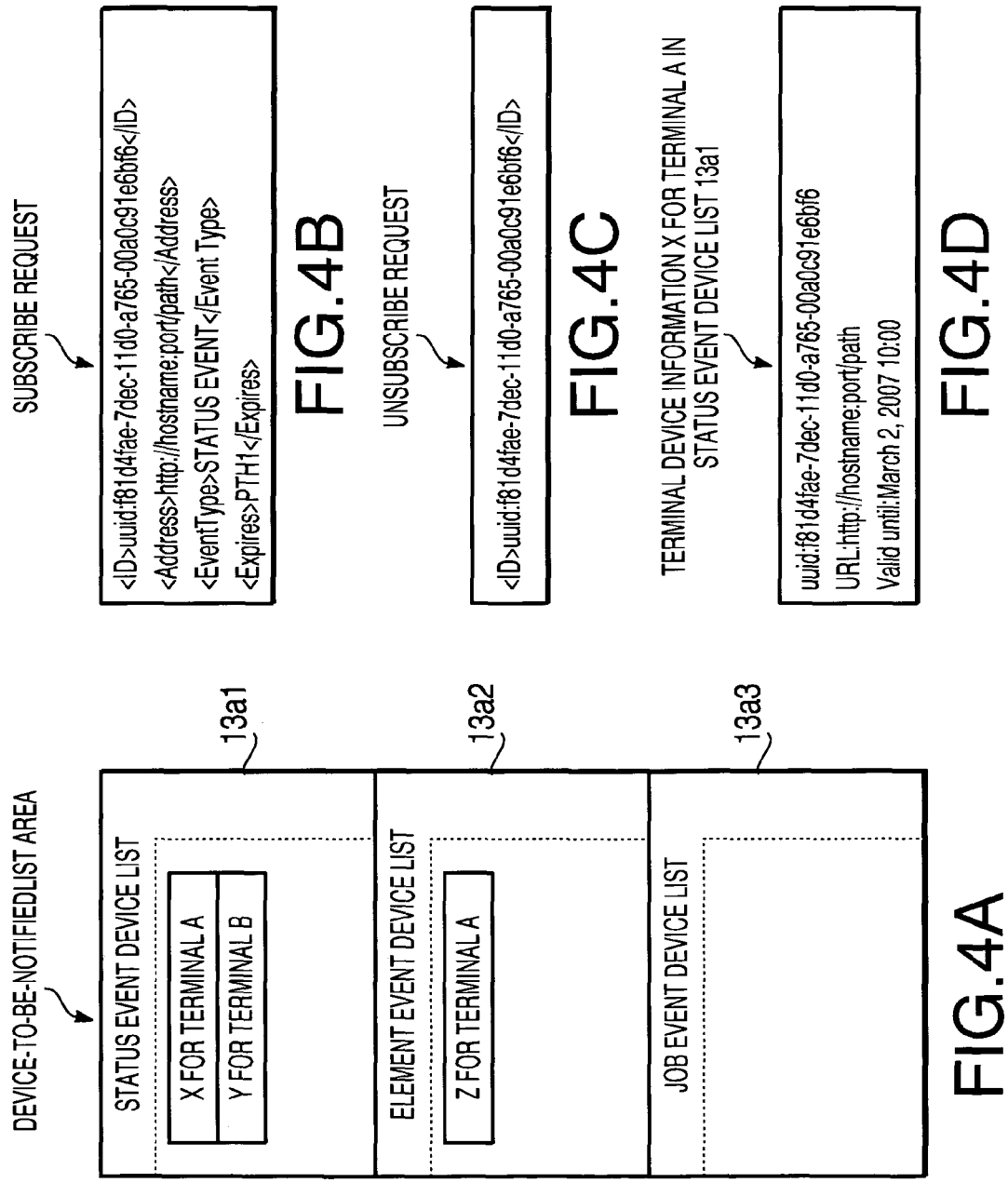

FIG.5A

| EVENT TYPES FOR PC TO REQUEST MFP FOR EVENT INFORMATION | CRITERIA TO BE DETECTED FOR EVENT NOTIFICATION |
|---|---|
| STATUS EVENT | AN ERROR, AN ERROR SOLVED IN MFP |
| ELEMENT EVENT | CONFIGURATION CHANGE IN MFP |
| JOB EVENT | STATE TRANSITION IN AN ACTIVE JOB IN MFP |

FIG.5B

| ERROR EVENTS TO BE DETECTED BY MFP | TRIGGER FOR THE EVENT |
|---|---|
| COVER-OPEN EVENT | DOCUMENT COVER OF SCANNER UNIT IS OPENED |
| COVER-CLOSE EVENT | DOCUMENT COVER OF SCANNER UNIT IS CLOSED |
| NO-INK EVENTN | INK IN PRINTING UNIT RUNS OUT |
| NO-SHEET EVENT | RECORDING SHEET IN PRINTING UNIT RUNS OUT |

STATUS EVENT LIST

ELEMENT EVENT LIST

JOB EVENT LIST

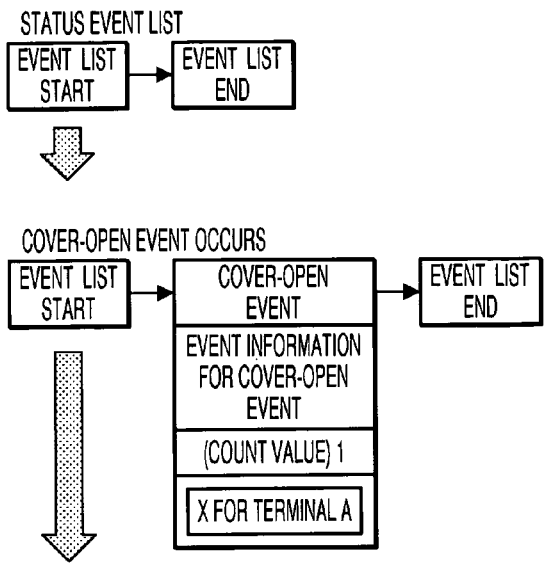
FIG.14A
FIG.14B
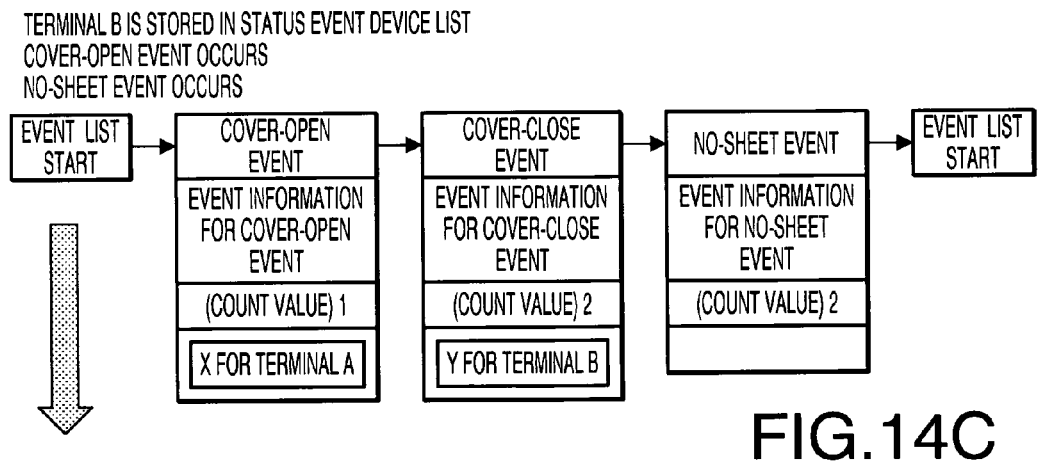
FIG.14C
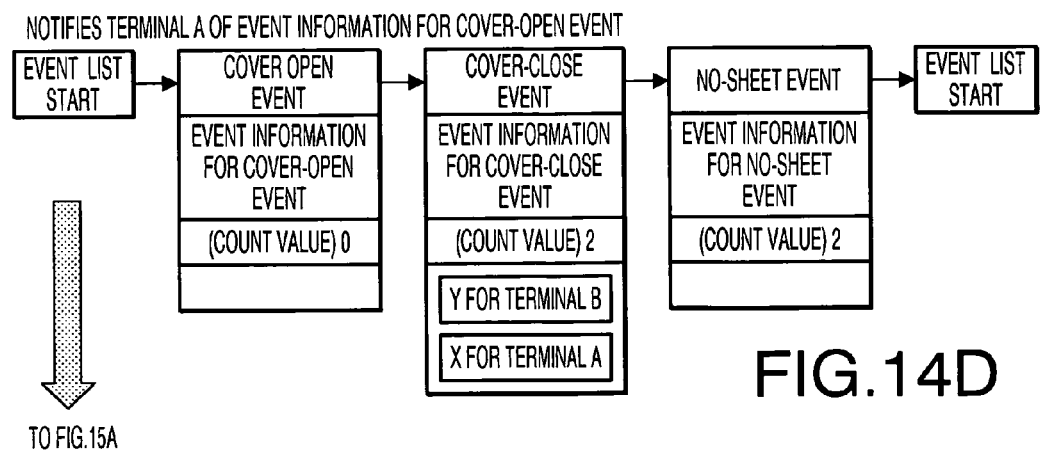
FIG.14D

NOTIFIES TERMINAL A OF EVENT INFORMATION FOR NO-SHEET EVENT

INFORMATION PROCESSING APPARATUS AND COMPUTER USABLE MEDIUM THEREFOR

TECHNICAL FIELD

The present invention relates to an information processing apparatus, which is capable of monitoring events (change of status) occurring in the apparatus itself and notifying client devices with event information corresponding to the occurred events, and an information processing program therefor.

BACKGROUND ART

Conventionally, there has been known an information processing apparatus capable of monitoring events (status changes) which occur in the apparatus itself and providing a plurality of client devices with event information corresponding to the occurred events. The information processing apparatus described in patent document 1 provides the client devices with information concerning an event, which is relevant to the client devices when the event occurs in the information processing apparatus itself. Therefore, information concerning various events that may occur in the information processing apparatus is stored in association with information concerning each client device in a storage of the information processing apparatus so that the information concerning the event is provided to the associated client devices when the event occurs.

[patent document 1] Japanese Patent Provisional Publication 2006-87058 (paragraph 0084 etc.)

DISCLOSURE OF THE INVENTION

Problems to be Solved by the Invention

In the above information processing apparatus (patent document 1), however, when a plurality of events occur in quick succession, the client devices may not be provided with the information concerning the events in the order occurrences. That is, the information concerning the events is transmitted from the information processing apparatus to the associated client devices regardless of communication status of each client device. Therefore, depending on the communication status of each client device, the information concerning the events may not necessarily received by the client devices in chronological order.

The present invention is made to solve the above problem. An object of the present invention is to provide an information processing apparatus and information processing program with which it is possible to monitor an event occurred in the apparatus itself, and notify event information corresponding to the occurred events with the client devices in the order of occurrences.

SUMMARY

To achieve the object, an information processing apparatus set forth in claim 1, there is provided an information processing apparatus configured to monitor a plurality of events which may occur due to status change of the information processing apparatus and notify event information corresponding to a occurred event to a client, characterized in that the information processing apparatus comprising, an order information storing means for storing order information for notifying the client with the event information in accordance with the order of occurrence of events, a notifying destination storing means for storing clients to which the invention information is to be notified, a notifying means for notifying the event information to the clients stored in the notifying destination storing means, a judging means for judging whether a notification of event information by the notifying means has been done successfully, and a changing means for notifying event information corresponding to an event which has occurred after the event corresponding to the event information in accordance with the order information stored in the order information storing means on condition that notification of the event information by the notifying means is judged to have been done successfully.

The information processing apparatus set forth in claim 2 is further characterized in the apparatus according to claim 1, such that it is provided with a receiving means for receiving a notification request for event information from a client device, a storing means for storing a client from which the notification request is received, an event detection means for detecting an occurrence of an event, and an event information generating means for generating event information corresponding to the event detected by the event detection means if the occurrence of the event is detected, wherein notifying destination storing means stores the client device stored in the storing means as a notifying destination of the event information corresponding to the detected event when the event is detected by the event detection means.

The information processing apparatus set forth in claim 3 is further characterized in the apparatus according to claim 1 or 2, such that the notifying means is capable of notifying the event information with a plurality of client devices, and the information processing apparatus further comprises a notifying destination number storing means for storing the number of the client devices stored in the notifying destination storing means for each piece of event information, and a first subtraction means for subtracting the number of client devices concerning the event information, which has been successfully notified to a client device by the notifying means, from the notifying destination number storing means.

The information processing apparatus set forth in claim 4 is further characterized in the apparatus according to claim 3, such that it is provided with an event information deleting means configured to delete event information indicating that that the number of clients stored in the event notifying information storage is zero from event notifying information.

The information processing apparatus set forth in claim 5 is further characterized in the apparatus according to any one of claims 1 through 4, such that it is provided with a notifying information deleting means for deleting the client, to which the piece of the event information was judged to be incapable of being provided, from the notifying information storage if the judging means judges that notification of the event information was failed, a second subtracting unit to subtract one from the number indicated in the counter in the event notifying information having the piece of the event information, and a third subtracting unit to subtract one from the number indicated in the counter in the event notifying information which is arranged, in the predetermined order in the event notifying information storage, to follow the event notifying information, of which event information is judged to be incapable of being provided.

A computer program set forth in claim 6 controls controlling a computer to monitor a plurality of events which occur in the information processing apparatus and provide event information concerning each of the events to the client device which is communicable with the information processing apparatus, the computer program causes the computer to function as, an order information storing means for storing order information for notifying the client with the event information in accordance with the order of occurrence of events, a notifying destination storing means for storing clients to which the invention information is to be notified, a notifying means for notifying the event information to the clients stored in the notifying destination storing means, a judging means for judging whether a notification of event information by the notifying means has been done successfully, and a changing means for notifying event information corresponding to an event which has occurred after the event corresponding to the event information in accordance with the order information stored in the order information storing means on condition that notification of the event information by the notifying means is judged to have been done successfully.

Effects of the Invention

According to the information processing apparatus set forth in claim 1, on condition that notification of one piece of event information is completed by the notifying means, another piece of event information regarding an event which has occurred after the event corresponding to the notified event information is notified. Therefore, to the client, pieces of event information can be notified in the order of occurrence of the events.

According to the information processing apparatus set forth in claim 2, in addition to the effect of the information processing apparatus set forth in claim 1, when a notifying request of the event information is received, by the request receiving means, from the client, the client is registered as the notifying destination to which event information regarding the events which occur after the receipt of the notification request. Thus, to the client from which the notification request is received, the event information regarding the events that occur after the receipt of the notification request can be notified. Therefore, management of the client to which the event information is notified and the order of the events can be made easier.

According to the information processing apparatus set forth in claim 3, in addition to the effect of the information processing apparatus set forth in claim 1 or 2, when the event information can be notified to a plurality of clients, the number of clients for each piece of event information is stored. Then, then the number of the clients to which the event information is successfully notified is subtracted therefrom. Therefore, even if there are clients to which the event information cannot be notified due to, for example, bad notification condition among a plurality of clients to which the event information is to be notified, subsequent event information can be notified for the clients to which the notification has been succeeded. Further, by storing the number of clients, whether the notification was succeeded can be managed for all the clients. Therefore, notification if the event information can be done in the order of occurrence of the events without affected by the communication condition of the other clients.

According to the information processing apparatus set forth in claim 4, in addition to the effect of the information processing apparatus set forth in claim 3, the event information of which the number of client stored in the notifying destination number storage is zero, that is the event information which can be successfully notified to all the clients is removed from the notifying destination storage. Therefore, a memory area can be used effectively.

According to the information processing apparatus set forth in claim 5, in addition to the effect of the information processing apparatus set forth in claims 1 through 4, the number of the clients to which the event information, which was failed to be notified, and another piece of even information corresponding to an event which occurred after the occurrence of the event related to the transmission-failed event is subtracted by one. Therefore, the number of the client to which the event information is to be notified can be managed accurately.

By causing a computer to execute the program set forth in claim 1, the image processing apparatus set forth in claim 1 can be realized.

DETAILED DESCRIPTION

Hereinafter, an embodiment according to the present invention will be described with reference to the accompanying drawings. FIG. 1 is a perspective view schematically illustrates a configuration of an MFP (multi function peripheral) 1 and a plurality of PCs (personal computers) 31 according to an embodiment of the present invention. The MFP 1 is provided with a plurality of functions such as a printing function, a scanning function, and a copying function.

FIG. 1 shows a configuration where the MFP 1 and the plurality of PCs 31, which may be also referred to as terminal A and terminal B respectively) are connected with one another through a LAN 200 to exchange data therebetween. Therefore, a user may utilize the functions of the MFP 1 through any of the PCs 31 and the LAN 200. For example, a piece of printable data can be transmitted from the terminal A to the MFP 1 so that an image according to the printable data is printed by a printing unit 21, or an image formed on a sheet of paper can be read by a scanner unit 20 to generate a piece of image data, and the image data can be transmitted from the MFP 1 to the terminal B to be modified.

In the MFP 1, various state transitions in the MFP 1 are detected as events. Such events include an error and completion of a printing operation, for example. More specifically, the MFP 1 is provided with various sensors (FIGS. 2, 20a, 21a and 21b), which output signals to indicate predetermined states (e.g., High signal when running short of ink, Low signal for other states). These signals are monitored by a CPU 11 (see FIG. 2) at predetermined intervals (e.g., several miliseconds). When the signals output from the sensors vary, the CPU 11 detects an occurrence of an event.

In front of a document cover 8, a laterally elongated operation panel 6 is provided. The operation panel 6 includes operation keys 15, an LCD (liquid crystal display) 16, and a speaker unit 17 (not shown). The user can executes various operations such as turning ON/OFF of the main power supply, switching among functions and the like by depressing various ones of the operation keys 15.

The LCD 16 displays operation menus, explanation of operational procedures, current status of an ongoing operation, a condition of the MFP 1. When an event occurs in the MFP 1 (see FIG. 5(b)), the PCs 31 are notified of the information concerning the event, and concurrently, the same information is displayed on the LCD 16.

Next, referring to FIG. 2, an electrical configuration of the MFP 1 will be described. FIG. 2 is a block diagram to illustrate an electrical configuration of the MFP 1 and one of the PCs 31. The MFP 1 includes the CPU 11, a ROM 12, and a RAM 13, the operation keys 15, the LCD 16, the speaker unit 17, a clock circuit 18, a LAN interface 19, the scanner unit 20, and the printing unit 21. The CPU 11, the ROM 12, the RAM 13 are interconnected through the bus line 26.

The operation keys 15, the LCD 16, the speaker unit 17, a clock circuit 18, a LAN interface 19, the scanner unit 20, and the bus line 36 are interconnected through an I/O port 27. The clock circuit 18 includes an internal clock to indicate current date.

The CPU 11 of the MFP 1 controls operations of each of the components connected with the I/O port 27 according to fixed values and programs stored in the ROM 12 and/or the RAM 13, controls of each function of the MFP 1, and various signals exchanged through the LAN interface 19. The ROM 12 is a read-only memory to store controlling programs to be executed by the CPU 11. Information processing programs (examples of information processing program set forth in the claims) show in FIGS. 7-13 are stored in the ROM 12.

The RAM 13 is a rewritable volatile memory to temporarily store various data during the operations in the MFP 1. The RAM 13 is provided with a device-to-be-notified list memory 13a which stores terminal device information, indicating to which PC 31 event information should be transmitted when an event occurs in the MFP 1. The event information includes a name of the event (event name) and current status of the event. The RAM 13 is also provided with an event-to-be-notified list memory 13b, which includes event notifying information, which is to be utilized to provide the event information to each of the PCs 31 when a same type of event occurs for a plurality of times in the MFP 1.

The device-to-be-notified list memory 13a is a memory for storing events included in a subscribe request on event type bases (see FIG. 5A) based on terminal device information, which is information (ID information, URL information, effective term information (extracted as actual time) extracted from the subscribe request (see FIG. 4B) (an example of notification request set forth in the claims) notified from the PC 31. The device-to-be-notified list memory 13a is provided with a status event device list 13a1, an element event device list 13a2, and a job event device list 13a3.

The event list memory 13b is a memory for storing device-to-be-notified (see FIG. 6D) indicating PCs 31 (terminals A and B) to which event information is notified in accordance with the occurrence order of the events when a plurality of events of a same type occur in the MFP 1. The event-to-be-notified list memory 13b includes a status event list 13b1, an element event list 13b2, and a job event list 13b3. In the event-to-be-notified list memory 13b, the plurality of pieces of the event notifying information are classified by the type of the occurred events (see FIG. 5), and stored as linked in accordance with the order of occurrence. The linkage of the plurality of pieces of event notifying information is provided in a list structure.

The list structure is a well-known structure, which is configured such that each piece of data (e.g., the event notifying information) is provided with location data (e.g., address) to indicate a location of a following piece of data (e.g., event notifying information) so that the pieces of the event notifying information are linked serially (without overlapping). In the following description, when a piece of data includes location data to indicate a location (i.e., address) of another piece of data, it is referred to that "a piece of data" is followed by "another piece of data" or "another piece of data" is linked from "a piece of data" to simplify the linked connection of two pieces of data.

As shown in FIGS. 6A-6C, in each of the event lists 13b1-13b3, data pieces "event list start" and "event list end" are provided. The data piece "event list start" is a pointer to indicate a location of heading event notifying information among the event notifying information connected with the link structure, whilst the data piece "event list start" indicates the end of the event notifying information linked in the list structure. A pointer refers to a known data type to store location (address) information of a data piece.

When no event notifying information is stored in event list 13b1, as shown in FIGS. 6A-6C, the "event list start" is immediately followed by the "event list end." So is in the event lists 13b2 and 13b3.

Once an event occurs in the MFP 1, event notifying information of the event is inserted immediately before the "event list end" in one of the status event lists 13b1-13b3, according to the event type. Then, the newly inserted piece of event notifying information is followed by the "event list end", and a location (address) of the newly inserted event notifying information is included in the preceding event notifying information which is followed by the "event end". Thus, pieces of event notifying information are linked in the order of occurrences of the events (see S16 of FIG. 8).

If the corresponding one of event lists 13b1-13b3, which corresponds to the occurred event, includes no event notifying information, the newly inserted event notifying information is followed by the "event end" and the location (address) of the newly inserted event notifying information is stored in the "event start" that was followed by the "event end" before.

The event notifying information is data for notifying event information of respective one of a plurality of events when a plurality of events of the same event type are occurred in the MFP 1 to each PC 31 (terminals A, B) in accordance with the order of occurrences of the events, and generated by the MFP 1 at every occurrence of an event.

Next, the event notifying information will be described referring to FIG. 6D. FIG. 6D illustrates exemplary contents of the event notifying information. As shown in FIG. 6D, the event notifying information includes an event name of the occurred event (see FIG. 5B), a counter value representing the number of pieces of terminal information stored in the terminal lists 13a1-13a3 corresponding to the event types of the occurred events (see FIG. 5A), and the terminal information stored in the terminal lists 13a1-13a3 corresponding to the event types of the occurred events.

The event name indicates a name of the event due to which the event notifying information has been generated (see FIG. 5B). The counter value indicates a number of terminal devices to be notified of the event information in the event notifying information. The counter value indicates the number of terminal devices stored in the terminal lists 13a1-13a3 corresponding to the occurred events when events, due to which the event notifying information is generated, occur. The event information is information corresponding to events because of which the event notifying information is generated.

Next, terminal device information included in the event notifying information will be described. When an event occurs and event notifying information for the event is generated in the MFP 1, if no previous event notifying information for an event in a same event type exists, all the pieces of terminal device information listed in the event device lists 13a1-13a3 corresponding to the newly occurred events are included in the newly generated event notifying information (see S15 of FIG. 8). Meanwhile, if there are one or more pieces of event notifying information for the same event type exists, only terminal device information excluding terminal information included in the existing event notifying information (S14 of FIG. 8)

The terminal device information for one of the PCs 31 is included in solely one of the plurality of pieces of event notifying information in a same event type. Therefore, event information of the same event type is not simultaneously notified. Further, the event notifying information is removed from the event-to-be-notified list memory 13b (see FIG. 2)

when notification of the event information to the all of the destinations so that other processes that utilizing the RAM 13 could utilize the RAM 13 effectively.

Next, an electrical configuration of the PC 31 will be described. The PC 31 includes a CPU 32, a ROM 33, a RAM 34, an HDD (hard disk drive) 35, a LAN interface 36, an input unit 37, and a display unit 38, which are interconnected through a bus line 40.

The CPU 32 controls operations of each of the components in the PC 31 according to fixed values and programs stored in the ROM 33, the RAM 34 and the HDD 35, control of various functions of the PC 31, and various signals exchanged through the LAN interface 36.

The ROM 33 is a read-only memory to store controlling programs to be executed by in the PC 31. The RAM 34 is a rewritable volatile memory to temporarily store various data. The HDD 35 is a rewritable nonvolatile data storage, and data stored therein is maintained even when electricity to the PC 31 is turned off. The HDD 35 stores various application software, various data created by the application software, and subscribe requests (see FIG. 4B) created by the application software of the like.

The LAN interface 36 is a known circuit. By connecting an end of a LAN cable 100 with a connection port of the LAN interface 36, and the other end to a LAN 200, data communication with various devices connected to the LAN 200 is enabled.

The input unit 37 is for managing the PC 31, using various application software stored in the HDD 35. For example, the input unit 37 has input devices such as a keyboard and a mouse. The display unit 37 is also used for managing the PC 31, and using various application software. The display unit 37 has, for example, a liquid crystal display.

Next, referring to FIGS. 3A-3C, requests and event information to be exchanged between the MFP 1 and the PC 31 will be described. FIGS. 3A-3C are image charts to schematically illustrate data flows to be exchanged between the MFP 1 and the PC 31.

FIG. 3A illustrates a state where the PC 31 transmits a subscribe request to the MFP 1. The subscribe request is a data piece to be transmitted from the PC 31 to the MFP 1 to request the MFP 1 to provide event information with the PC 31 that transmitted the request when an event occurs in the MFP 1.

Referring to FIG. 4B, an example of the subscribe request will be described. The subscribe request is the data the PC 31 transmits to the MFP 1 to request the MFP 1 to notify the event information. The subscribe request is, for example, generated by the PC 31 and is described in the XML (extensible markup language). The subscribe request includes ID information for the MFP 1 and the PC 31 to recognize the request, location (i.e., URL) information indicating a location of the PC 31 to which the event information should be transmitted from the MFP 1 to the PC 31, information to indicate an event type for which the PC 31 request MFP 1 to transmit, and validity information indicating a period of time within which the PC 31 request the MFP 1 to transmit the event information.

As shown in FIG. 4B, character strings enclosed in <ID> and </ID> tags in a first line in the subscribe request (i.e., "uuid:f81d4fae-7dec-11d0-a765-00a0c91e6bf6") indicates the ID information of the subscribe request. The ID information includes randomly collected unique character strings UUID (universally unique identifier), which are created each time a subscribe request is generated in the PC 31. Thus, the MFP 1 identifies the subscribe requests transmitted from the PCs 31 (see FIG. 1), unsubscribe requests (see FIG. 4C), and the terminal device information (see FIG. 4D) by the ID information.

Character strings enclosed in <Address> and </Address> tags in a second line (i.e., "http://hostname:port/path") indicates the location (i.e., URL) to which the event information should be transmitted from the MFP 1 to the PC 31. The URL (uniform resource locator) is a method to describe a location of various elements including data, apparatuses, and services existing in a network such as the Internet.

The "hostname" (or IP address) (which is an example of first identifying information described in claim 1) in the URL indicates a host name or an IP address of the PC 31 which generated the subscribe request, and the "port" indicates a port number (which is an example of second identifying information described in claim 1). The hostname (or IP address) is identifying information to identify the PC 31 on the network, and the port number is an identifying number identifying an application program in the PC 31, which generated the subscribe request, and to which the event information is provided among a plurality of application programs. A character string "path" indicates a path name such as a folder name and a file name provided in the HDD 35 (see FIG. 2) of the PC 31 which generated the subscribe request.

Character strings enclosed in <EventType> and </Event Type> tags in a third line (i.e., "status event") indicates the type of the event for which the PC 31 generated the subscribe request requires the MFP 1 to transmit.

The types of the event information (i.e., event types) include, "status event", "element event", and "job event", as shown in FIG. 5A. One of the three event types is specified by the application program or by the user and indicated in one subscribe request.

Character strings enclosed in <Expires> and </Expires> tags in a fourth line (i.e., "PT1H") indicates the validity information of the subscribe request. The "PT" is an abbreviation of "period of time", and "PT1H" indicates that the validity period of the subscribe request is one hour. The MFP 1 notifies the event information of the event indicated in the subscribe request to the PC 31 within the validity period starting from the time when the MFP 1 receives the subscribe request.

When the MFP 1 receives the subscribe request from the PC 31, the MFP 1 identifies the event type and other pieces of information (e.g., the ID information, the URL information, and the validity information). Regarding the validity period, the MFP 1 obtains the current time from the clock circuit 18 (see FIG. 2), and calculates actual validation time, based the validity information identified from the subscribe request. For example, if the subscribe request as shown in FIG. 4B is received (validation time: PT1H) at 9:00 o'clock on Mar. 2, 2007, the actual validation time is calculated to be 10:00 o'clock on Mar. 2, 2007.

The ID information, URL information and validity information thus identified from the subscribe request are stored in the device-to-be-notified list (one of the status event device list 13a1, the element event device list 13a2, and the job event device list 13a3) as the device information (see FIG. 4D) of the PC 31 according to the event type identified from the subscribe request stored in the device-to-be-notified list memory 13a.

Specifically, if the event type indicated in the subscribe request is "status event", the ID information, the URL information, the validity information identified from the subscribe request are stored, as the terminal device information of the PC 31, in the status event device list 13a1. Similarly, if the event type is "element event", the terminal device information is stored in the element event device list 13a2, and if the event type is "job event", the terminal device information is stored in the job event device list 13a3 (see FIG. 4A).

It is shown in FIG. 4A that a subscribe request for a status event from the terminal A, a subscribe request for an element event from the terminal A, a subscribe request for a status event from the terminal device B were issued and transmitted to the MFP 1. The terminal device information X and Y respectively for the terminal devices A and B are stored in the status event device list 13a1, and the terminal device information Z for the terminal device C is stored in the element event device list 13a2.

Even if a plurality of pieces of terminal device information X and Z are stored in the device-to-be-notified list memory 13a, since each ID information included in each subscribe request is universally unique character strings, the plurality of pieces of terminal device information X and Z are identical as distinct terminal information.

When the terminal device information is stored in the device-to-be-notified list memory 13a, the MFP 1 notifies the PC 31 of the receipt of the subscribe request.

Next, referring to FIG. 3C, an example of an unsubscribe request transmitted from the PC 31 to the MFP 1 will be described. The unsubscribe request is transmitted from the PC 31 to the MFP 1 when it becomes unnecessary for the PC 31 to receive event information from the MFP 1.

As shown in FIG. 4C, the unsubscribe request is provided solely with ID information. The ID information includes the UUID which was included in the corresponding subscribe request requiring for the event information. When the PC 31 issues an unsubscribe request to ask the MFP 1 to no longer provide the event information, the PC 31 includes the UUID included in the subscribe request in the unsubscribe request. It is noted that the ID information is unique and does not overlap any ID information in the other subscribe requests in the MFP 1 or the PC 31, therefore, the MFP 1 can recognize terminal device information to be removed from the device-to-be-notified list memory 13a. With the unsubscribed request, only one piece of terminal device information which has the ID information that coincides with the ID information contained in the unsubscribe request is deleted.

When the MFP 1 receives the unsubscribe request from the PC 31, it removes the terminal device information (see FIG. 4D) having the ID information which is identical to the ID information included in the received unsubscribe request from the device-to-be-notified list memory 13a (see FIG. 2). Thereafter, the MFP 1 notifies the PC 31 of receipt of the unsubscribe request.

Next, referring to FIG. 3B, the event information to be transmitted from the MFP 1 to the PC 31 will be described. When an event occurs in the MFP 1, the MFP 1 transmits event information to the PC 31, of which terminal device information is stored in the device-to-be-notified list memory 13a.

In the MFP 1, the event notifying information is classified on the event type basis and stored in the event-to-be-notified list memory 13b (list 13a1-13a3: see FIG. 4A). Therefore, when an even occurs in MFP 1, the event information is transmitted to the PC 31 which is stored in the corresponding one of the terminal device lists 13a1-13a3 according to the occurred event.

In order to transmit the event information to the PC 31, the MFP 1 generates the notification device information. The generated notification device information is classified by the event type and stored in the notifying event list memory 13b (see FIG. 2). Notification of the event information is performed to each PC 31 based on the notification information stored in the notifying event list memory 13b.

When an event is detected in the MFP 1, the MFP 1 generates the event information, which indicates, for example, a name of the event and status of the event, and transmits the event information to the PC 31. Specifically, when an error occurs, that is, when the printing unit 21 in the MFP 1 is incapable of printing due to lack of ink, recording sheet, or when the scanner unit 20 is incapable of reading an image because the document cover 8 on the top surface of the scanner unit 20 is open (a "cover-open event"), the MFP 1 transmits the contents of the error to the PC 31. With this configuration, the user can know the contents of the error without moving to the MFP 1 and checking the statuses displayed on the LCD 16 (see FIG. 1) of the MFP 1. Further, it is noted that the PC 31 is not provided with event information of all the events occur in the MFP 1, but event information of the events preliminarily requested by the subscribe request from the PC 31 is exclusively provided to the PC 31.

For example, if a subscribe request for event information of an event, of which event type is "status event", is issued from the PC 31 to the MFP 1, and when an error (e.g., an error to be detected by any of the sensors 20a, 21a, 21b such as shortage of ink, absence of recording sheet, etc. as shown in FIG. 5B) is detected, or recovery from the error is detected, event information to indicate the error, or the recovery is from the MFP 1 to the PC 31.

For another example, if a subscribe request for event information of an event, of which event type is "element event" is issued by the PC 31, and when a change in setting information of the MFP 1 (e.g., an IP address, a printer name, etc.) is detected, event information to indicate the changed setting information is notified from the MFP 1 to the PC 31.

Further, if a subscribe request for event information of an event, of which event type is "job event", is issued from the PC 31 to the MFP 1, and when a change in status of a running job (e.g., print start, print completion, etc.) is detected, event information to indicate the change is transmitted from the MFP 1 to the PC 31. Hereinafter, referring to FIGS. 7-14D, various processes executed by the CPU 11 of the MFP 1 will be described.

The MFP 1 is configured such that, if a plurality of events of the same event type occur in the MFP 1, the MFP 1 notifies the event information of each event in accordance with the order of occurrence of the events. For example, it is assumed that a cover open event (see FIG. 5B) occurs a plurality of times and subsequently if the MFP 1. In the following description, a firstly occurred cover open event will be referred to as a "cover open event A" and a subsequently occurred cover open event will be referred to as a "cover open event B". The MFP 1 firstly notifies the "cover open event A" and then notifies the "cover open event B" to both the terminals A and the terminal B.

FIG. 7 is a flowchart to illustrate a main process of the MFP 1, which process is repeatedly executed once the MFP 1 is powered on and until the MFP 1 is powered off. In the main process, the device-to-be-notified list memory 13a and the event-to-be-notified list memory 13b is initialized (S1).

Next, it is judged whether an event occurred in the MFP 1 (S2). If an event has occurred (S2: YES), an event list addition process is executed (S3). If no event is detected (S2: NO), S3 is skipped and the process proceeds to S4.

Hereinafter, referring to FIG. 8, the event list addition process (S3) will be described. FIG. 8 is a flowchart to illustrate the event list addition process (S3). In the event list addition process (S3), the MFP 1 generates event notifying information which includes event information of the event occurred in the MFP 1, and stores the generated event notifying information in one of the status event device list 13a1, the element event device list 13a2, and the job event device list 13a3, depending on the event type of the event occurred (see FIG. 2).

In the event list addition process (S3), it is judged whether terminal device information is stored in the one of the device lists 13a1, 13a2 and 13a3 of the device-to-be-notified memory 13a (S11). If terminal device information is stored in the device lists 13a1-13a6 of the device-to-be-notified memory 13a corresponding to the occurred event (S11: YES), it is judged whether event notifying information is stored in the event lists 13b1, 13b2 and 13b3 of the event-to-be-notified list memory 13b corresponding to the occurred event (S12). If no terminal device information is stored in the device lists 13a1-13a6 of the device-to-be-notified memory 13a corresponding to the occurred event (S11: NO), S12-S17 are skipped and the process is terminated.

In S12, if event notifying information is stored in the event lists 13b1, 13b2 and 13b3 of the event-to-be-notified list memory 13b corresponding to the occurred event (S12: YES), terminal device information included in each piece of the event notifying information is searched (S13).

Then, event notifying information is generated (S14), which includes an event name of the event occurred, event information corresponding to the event, and a counter value indicating a number of terminal devices to be notified of the event information in the event notifying information stored in the one of the device lists 13a1-13a6 of the device-to-be-notified memory 13a is included except that the terminal device information for the PC 31 obtained in S13 is eliminated.

In S12, if no event notifying information is stored in the event lists 13b1-13b3 of the event-to-be-notified memory 13b corresponding to the occurred event (S12: NO), event notifying information including an event name, event information corresponding to the event, a counter value indicating a number of terminal devices is generated. Further, in this step, all terminal device information stored in the one of the event device lists 13a1-13a6 of the device-to-be-notified memory 13a corresponding to the occurred event, including the terminal device information obtained in S13, is included (S15).

Then, the generated event notifying information is inserted immediately before the "event list end" in the one of the event lists 13b1-13b3 in the event-to-be-notified memory 13b corresponding to the occurred event S16). Next, the event information included in the event notifying information is provided to the PCs 31 indicated by the terminal device information, which is indicated in the event notifying information (S17). The event list addition process (S3) is then terminated.

Thus, in the event list addition process (S3) shown in FIG. 7, the MFP 1 is capable of generating the event notifying information for the event occurred, and storing the event notifying information in one of the event lists 13b1-13b3 corresponding to the occurred event, in chronological order.

Following S3, the process proceeds to S4 of FIG. 7. In S4, it is judged whether the PC 31 issues a request for connection (S4). If connection request has been issued (S4: YES), a data receiving process is executed (S5). If connection request has not been issued (S4: NO), the process proceeds to S6, skipping S5.

Now, referring to FIG. 9, the data receiving process (S5) will be explained. FIG. 9 is a flowchart illustrating the data receiving process (S5). In this data receiving process (S5), the MFP 1 receives various data including a subscribe request and an unsubscribe request transmitted from the PC 31, or other data, and performs various processes according to the received data.

In the data receiving process (S5), the CPU 11 connects the MFP 1 with the PC 31 and receives data transmitted from the PC 31 (S21). It is judged whether the received data is a subscribe request (S22). If the received data is the subscribe request (S22: YES), various pieces of information (i.e., ID information, location information, information to indicate an event type, and validity information which is extracted as an actual time) are extracted from the subscribe request and stored in one of the device lists 13a1-13a3 of the device-to-be-notified memory 13a corresponding to the event type included in the subscribe request as terminal information (S23). Then, the MFP 1 notifies the PC 31 that the terminal device information is stored in the device-to-be-notified memory 13a (S24). It is noted that the steps S22-S24 corresponds to FIG. 3A. In S22, when the received data is not a subscribe request (S22: NO), the process proceeds to S25, skipping steps S23-S24.

Next, it is judged as to whether the data received from the PC 31 is an unsubscribe request (S25). If the received data is an unsubscribed request (S25: YES), the terminal device information having ID information identical to the ID information included in the unsubscribe request is searched through the device-to-be-notified list memory 13a, and delete the same (S26). Next, an event list terminal device information deleting process is executed (S27).

Now, referring to FIG. 10, the event list terminal device information deleting process (S27) will be described. FIG. 10 is a flowchart to illustrate the event list terminal device information deleting process. In this process (S27), the terminal device information stored in the device-to-be-notified memory 13a and deleted from the list is also deleted from the event-to-be-notified list memory 13b.

In the event list terminal information deleting process (S27), event notifying information with the terminal device information, which has ID information identical to the ID information being included in the unsubscribe request, is searched through the event-to-be-notified list memory 13b (S31). Then, one of the event lists 13b1-13b3 in the event-to-be-notified list memory 13b, in which the event notifying information is detected, is read (S32). Further, the event notifying information with the terminal device information, which has ID information identical to the ID information being included in the unsubscribe request, is obtained from the one of the event lists 13b1-13b3 (S32).

Next, the counter value included in the event notifying information obtained in S33 is decremented by one, and the terminal device information having the same ID information which is identical to the ID information contained in the received unsubscribe request is deleted (S34).

It is judged whether the event notifying information obtained in S33 is linked with another piece of event notifying information (S35). If there is a piece of event notifying information linked to the event notifying information obtained in S33 (S35: YES), each counter value included in the pieces of event notifying information subsequent to the notifying information obtained in S33 to the "event list end" is decremented by one (S36). If there is no event notifying information subsequent to the event notifying information obtained in S33 (S35: NO), the process proceeds to S37, skipping S36.

Next, it is judged whether there is event notifying information having a counter value of "zero" is included in one of the event lists 13b1-13b3, which is read in S32 (S37). If here is event notifying information having a counter value of "zero" in one of the event lists 13b1-13b3 (S37: YES), all pieces of the event notifying information with the counter value of "zero" are deleted from the event lists 13b1-13b3 (S38). If there is no event notifying information having a counter value of "zero" in event lists 13b1-13b3 (S37: NO), the event list terminal information deleting process (S27) is terminated, skipping S38.

In the event list terminal device information deleting process (S27) shown in FIG. 10, information identical to the terminal device information deleted from the device-to-be-notified list memory 13a can be deleted from the event-to-be-notified list memory 13b when the unsubscribe request is received. In addition, the counter values in the event notifying information following the event notifying information, of which terminal device information is deleted, are decremented by one so that the event notifying information having the counter values of "zero" as decremented is deleted from the event-to-be-notified list memory 13b.

As the event list terminal device information deleting process (S27) is terminated, the process returns to S28 of FIG. 9. In S28, it is notified to the PC 31 that the terminal device information is deleted from the device-to-be-notified list memory 13a (S28). It is noted that the steps S25-S28 correspond to FIG. 3C. In S25, if the received data is not an unsubscribe request (S25: NO), the process proceeds to S29, skipping S26-S28.

If the data received from the PC 31 is other data, the CPU 11 performs other step corresponding to the received data (S29), disconnects the connection with the PC 31 (S30) and terminates the receiving data process (S5). The other process may be a process to receive print data and prints the print data on a recording sheet.

In the data receiving process of which a flowchart is shown in FIG. 9, the MFP 1 can receive the subscribe request and the unsubscribe request from the PC 31. When the MFP 1 receives the subscribe request, necessary information can be extracted therefrom to generate the terminal device information and stored the terminal device information in the device-to-be-notified list memory 13a. When the MFP 1 receives the unsubscribe request, the terminal device information which has the ID information identical to the ID information included in the unsubscribe request can be deleted from the device-to-be-notified list memory 13a and the event-to-be-notified list memory 13b. Further, when the terminal device information is deleted from the event-to-be-notified list memory 13b, the counter values included in the event notifying information from which the terminal device information is deleted, and in the subsequent pieces of the event notifying information, are respectively decremented by one. The event notifying information having the updated counter values of "zero" are deleted from the event-to-be-notified list memory 13b.

As the data receiving process (S5) is terminated, the process returns to S6 of FIG. 7. In S6, it is judged whether the event notifying information is included in the event-to-be-notified list memory 13b (S6). If the event notifying information is included in the event-to-be-notified list memory 13b (S6: YES), an event list updating process (S7) is executed. Next, a failure terminal device information deleting process is executed (S8). If no event notifying information is included in the event-to-be-notified list memory 13b (S6: NO), the process proceeds to S9, skipping S7-S8.

Hereinafter, referring to FIG. 11, the event list updating process (S7) will be described. FIG. 11 is a flowchart to illustrate the event list updating process (S7). The event list updating process (S7) is a process in which, when the notifying information is stored in the event-to-be-notified list memory 13b, the terminal device information to which notification of the event information has been finished is shifted to a subsequent piece of notifying information, or the notifying information which has been transmitted to the PCs 31 of all the pieces of the terminal device information is deleted from the event-to-be-notified list memory 13b.

In the event list updating process (S7), the event-to-be-notified list memory 13b is searched to find one of the event lists 13b1-13b3, which includes the event notifying information (S41). Then, a detected one of the event lists 13b1-13b3 is read (S42), and event notifying information to follow immediately after the "event list start" in the one of the event lists 13b1-13b3 is read.

Next, it is judged (S44) whether the event notifying information includes terminal device information for the PCs 31 which have been provided with the event information. If the event notifying information includes such terminal device information (S44: YES), it is judged whether the event notifying information obtained in S43 is followed by (linked with) another piece of event notifying information (S45). If the event notifying information dose not include such terminal device information (S44: NO), the process proceeds to S51, skipping S45-S50.

In S45, if there exists another piece of event notifying information which is linked with next piece of event notifying information (S45: YES), the counter value is updated such that the number of the PCs 31 which have been provided with the event information is subtracted from the counter value obtained in S43, and the terminal device information of the PCs 31, which have been provided with the event information, is passed to the linked event notifying information (S46). Next, the event information included in the event notifying information having the passed terminal device information is provided to the PCs 31, which are indicated in the passed terminal device information (S47).

In S45, if the event notifying information is not followed by another piece of event notifying information (S45: NO), the counter value obtained in S43 is updated such that the number of the PCs 31, which have been provided with the event information, is subtracted from the counter value, and the terminal device information of the PCs 31, which have been provided with the event information, is deleted from the event notifying information (S48).

Next, it is judged whether the counter value in the event notifying information obtained in S43 is zero (S49). If the counter value obtained in S43 is zero (S49: YES), the event notifying information is deleted from the event lists 13b1-13b3 (S50). It is noted that the counter value zero in the event notifying information indicates completion of the notification of the event information. Therefore, by removing such event notifying information, other processes using the RAM 13 can use the RAM 13 efficiently.

If it is judged that the count value in the event notifying information read in S43 is not zero (S49: NO), the process proceeds to S51, skipping S50.

Next, it is judged as to whether the event notifying information obtained in S43 is followed by (linked with) another piece of event notifying information (S51). If there exits another piece of event notifying information following the event notifying information obtained in S43 (S51: YES), the another piece of event notifying information following the event notifying information obtained in S43 is obtained (S52), and the process returns to S44 and repeats S44 through S52.

In S51, if the event notifying information obtained in S43 is not followed by another piece of event notifying information (S51: NO), it is judged whether the entire event-to-be-notified list memory 13b is searched through to find all of the event lists 13b1-13b3 containing the event notifying information (S53). When the entire event-to-be-notified list memory 13b is searched through to read all of the event lists 13b1-13b3 containing the event notifying information (S53: YES), the event list updating process (S7) is terminated.

If the entire event-to-be-notified list memory 13b is not searched through to read all of the event lists 13b1-13b3 (S53: NO), the process returns to S42 and repeat S42 through S53.

With the event list updating process (S7) as described above and shown in FIG. 11, when the event notifying information is included in the event list memory 13b, the terminal device information of the PCs 31 which were notified of the event information can be passed to the following piece of the event notifying information so that the event information included in the following piece of the chronological notifying information can be provided to the PCs 31, of which terminal device information is passed. Therefore, when a same type of event occurs for a plurality of times in the device, the event information for each event can be provided to the respective PCs 31 (terminal devices A and B) in chronological order, in which the events occur. Further, when notification of the event information completes for all the PCs included in the event notifying information, the event notifying information can be removed from the event list memory 13b.

When the event list updating process (S7) is terminated, the process returns to S8 of FIG. 7. In S8, the failure terminal device information deleting process is executed.

Hereinafter, referring to FIG. 12, the failure terminal device information deleting process (S8) will be described. FIG. 12 is a flowchart to illustrate the failure terminal device information deleting process. In this failure terminal device information deleting process (S8), notification of the event information to the PC 31 fails for predetermined times (e.g., twice) due to disconnection between the MFP 1 and the PC 31, the terminal device information of the PC 31 is deleted from the device-to-be-notified list memory 13a and from the event list memory 13b. The number of the predetermined times can be determined based on various factors such as a network environment and communication speed of the network.

In the failure terminal device information deleting process (S8), it is judged whether there exits the terminal information which indicates failure of connection to the PC 31 for predetermined times (S61). If no such terminal device information exists (S61: NO), the failure terminal device information deleting process (S8) is terminated, skipping S62-S70.

If there exists the terminal device information indicating the failure of connection (S61: YES), the terminal device information indicating the failure of connection by the predetermined times is deleted from the device-to-be-notified list memory 13a (S62). Then, one of the event lists 13b1-13b3 which includes the terminal device information corresponding to the terminal device information being deleted in S62 is read (S63).

From the event lists 13b1-13b3 read in S63, the notifying information which includes the terminal device information is read (S64). Then, the counter value in the event notifying information is decremented by one, and the terminal device information indicating the failure of connection with the PC 31 included in the notifying information by the predetermined times is deleted (S65).

Next, it is judged whether the event notifying information is followed by another piece of event notifying information (S66). If another piece of event notifying information is linked with the notifying information read in S64 (S66: YES), each counter value included in all of the pieces of event notifying information following the event notifying information obtained in S64 before the "event list end" is decremented by one (S67). If no event notifying information follows the event notifying information read in S64 (S66: NO), the process skips S67 and proceeds to S68.

In S68, it is judged whether event notifying information having a counter value "zero" is included in the one of the event lists 13b1-13b3 read in S63 (S68). If event notifying information having a counter value "zero" is included in the one of the event lists 13b1-13b3 read in S63 (S68: YES), in S69, all pieces of the event notifying information with the counter value "zero" are deleted from among the event lists 13b1-13b3 read in S63 (S69). It is noted that the event notifying information with the counter value of "zero" is data which is not necessary any more since notification has been finished. Therefore, when such event notifying information is removed from the RAM 13, other processes using the RAM can use the RAM 13 effectively.

If no event notifying information with the counter value "zero" is found in the event lists 13b1-13b3 read in S63 (S68: NO), the process proceeds to S70, skipping S69.

In S70, it is judged whether another terminal device information indicating failure of connection by predetermined times is included in the device-to-be-notified list memory 13a (S70). If there exists another terminal device information indicating failure of connection by predetermined times (S70: YES), the process returns to S62 to repeat steps S62 through S70. If there does not exist another terminal device information indicating failure of connection by predetermined times (S70: NO), the connection failure terminal device information deleting process (S8) is terminated.

In the failure terminal device information deleting process shown in FIG. 12, when attempts to connect the PC 31 with the MFP 1 fail for predetermined times, the terminal device information of the PC 31 can be deleted from the device-to-be-notified list memory 13a and from the event list memory 13b. Further, since the terminal device information of the PC 31 of which connection was failed for the predetermined times is removed from the device-to-be-notified list memory 13a, event information corresponding to events which terminated occur after the removal is prevented from attempting in vain to be notified to the PC 31.

When the failure terminal device information deleting process is, the process returns to S9 in FIG. 7. In S9, a validity period examining process (S9) is executed. After completion of the validity period examining process (S9), the process returns to S2 and repeats S2-S9.

Hereinafter, referring to FIG. 13, the validity period examining process (S9) will be described. FIG. 13 is a flowchart to illustrate the validity period examining process (S9). In the validity period examining process (S9), validity periods included in the terminal device information (see FIG. 4A), which is stored in the device-to-be-notified list memory 13a, are examined, and deletes the terminal device information having expired validity periods from the device-to-be-notified list memory 13a and from the event list memory 13b.

In the validity period examining process (S9), a piece of terminal device information is retrieved from the device-to-be-notified list memory 13a (S71), and current time is obtained from the clock circuit 18 (S72).

Next, it is judged (S73) whether the current time has passed the validity period which is read in S71. If the current time has passed the obtained validity period (S73: YES), the terminal device information obtained in S71 is deleted from the device-to-be-notified list memory 13a (S74). In S73, if the current time has not passed the validity period (S73: NO), the process proceeds to S82, skipping S74-S81.

Next, the event lists 13b1-13b3 in the event-to-be-notified memory 13b, which included the terminal device having been deleted is read (S75), and the event notifying information included the deleted terminal device information is obtained from the read event list 13b1-13b3 (S76). Then, the counter value in the event notifying information obtained in S76 is decremented by one, and the terminal device information, of which the validity period is expired, in the event notifying information is deleted (S77).

It is judged whether the event notifying information obtained in S76 is followed by (linked with) another piece of event notifying information (S78). If another piece of event notifying information is linked (S78: YES), each counter value included in all of the succeeding pieces of event notifying information before the "event list end" is decremented by one (S79). If no event notifying information is linked with the event notifying information obtained in S76 (S78: NO), the process skips S79 and proceeds to S80.

Next, it is judged whether event notifying information having a counter value "zero" is included in the one of the event lists 13b1-13b3, which is read in S76 (S80). If the event notifying information having a counter value "zero" is included in the one of the event lists 13b1-13b3, which is read in S76 (S80: YES), all pieces of the event notifying information having a counter value "zero" is included in the one of the event lists 13b1-13b3 in S81, which is read in S76 are deleted (S81). It is noted that the counter value zero in the event notifying information indicates completion of the notification of the event information and such information is no longer useful. Therefore, when such event notifying information is removed from the RAM 13, other processes which use the RAM 13 can use the RAM 13 effectively.

If the event notifying information having a counter value "zero" is not included in the event lists 13b1-13b3 read in S76 (S81: NO), the process proceeds to S82, skipping S81.

Next, it is judged whether all the pieces of terminal device information in the event-to-be-notified list memory 13b is read (S82). If all the pieces of terminal device information in the event-to-be-notified list memory 13b is read (S82: YES), the validity period examining process (S9) is terminated. If all the pieces of terminal device information in the event-to-be-notified list memory 13b is not read (S82: NO), the process returns to S71, and repeats S71-S82.

In the validity period examining process as described above and shown in FIG. 13, validity of the terminal device information (see FIG. 4A) stored in the device-to-be-notified list memory 13a can be checked so that the terminal device information of which the validity period is expired can be deleted from the device-to-be-notified list memory 13a and from the event list memory 13b. Therefore, the event information can be provided to the PCs 31 only within the validity period.

When the validity period examining process (S9) is terminated, the process returns to S9 of FIG. 7 and repeats S2-S9.

Referring to FIGS. 14A-14D and 15A-15D, exemplary contents of device-to-be-notified generated by the MFP 1, and notifications of the event information provided to the terminal devices A and B will be described. FIGS. 14A-14D show examples of contents of the status event list 13b1. In FIG. 14A, the status event list 13b1, in which no event notifying information is stored, is shown. In the present example, it is assumed that the terminal A has preliminarily issued a subscribe request to the MFP 1 for event information concerning an event, of which event type is status event. Accordingly, terminal device information X for the terminal A is stored in the status event device list 13a1 (see FIG. 3A). In the present example, further, it is assumed that the cover open/close sensor 20a detects the cover being open, and subsequently the cover being closed, and the recording sheet detecting sensor 21b detects lack of the recording sheet. Meanwhile, in the terminal B, the cover open/close sensor 20a detects the cover being open, and the terminal B issues a subscribe request for event information concerning a status event.

When a cover-open event occurs in the MFP 1, the MFP 1 generates event notifying information so that event information corresponding to the cover-open event is provided to the terminal A. In this case, the event notifying information to be generated by the MFP 1 includes an event name "cover-open event", event information "event information corresponding to the cover-open event", a counter value "1", which indicates the number of terminal devices to be notified of the event information, and terminal device information "X for terminal A", indicating to which terminal device the event information should be provided. The terminal device information is obtained from the status event device list 13a1 based on the event type of the event occurred (i.e., the cover-open event).

The event notifying information for the "cover open event" generated as above is inserted immediately before the "event list end" in the status event list 13b1 as shown in FIG. 14B. Then, the "event list start" is followed by the event notifying information, which is linked with the "event list end". As the event notifying information is stored in the status event device list 13a1, the MFP 1 provides the event information included in the event notifying information to the terminal A, which is indicated in the terminal device information X for the terminal device.

Meanwhile, the terminal B (see FIG. 1) issues a subscribe request to the MFP 1 for event information concerning a status event. Accordingly, the MFP 1 stores the terminal device information "Y for terminal B" in the status event device list 13a1 and notifies the terminal B of the receipt of the subscribed request. Thus, the terminal device information "X for terminal A" and "Y for terminal B" are stored in the status event device list 13a1. It is noted that the terminal B will be notified of event information of subsequent events which occur after the MFP 1 receives the subscribe request. Therefore, first event information to be notified to the terminal B will be the event information concerning the cover-close event.

When a cover-close event occurs in the MFP 1, the MFP 1 generates event notifying information to provide the terminal A and the terminal B respectively with "event information corresponding to the cover-close event". As shown in FIG. 14C (in the middle column), the event notifying information generated at this point includes an event name "cover-close event", event information "event information corresponding to the cover-close event", and a counter value 2, which indicates the number of terminal devices to be notified of the event information, and terminal device information "Y for terminal B", indicating to which terminal device the event information should be provided. The terminal device information is obtained from the status event device list 13a1 based on the event type of the event occurred (i.e., the cover-close event).

The counter value indicates the number of pieces of terminal device information in the status event device list 13a1 at the time when the event occurs (i.e., 2). It is noted that the current event notifying information (shown in the middle column in FIG. 14C) solely includes the terminal device information "Y for terminal B", because the terminal device information "X for terminal A" is included in the previously generated event notifying information, which is shown in the second left column in FIG. 14C.

The currently generated event notifying information is inserted immediately before the "event list end" in the status event list 13b1. Thus, the status event list 13b1 includes "event list start", the event notifying information for the cover-open event, the event notifying information for the cover-close event, and "event list end", which are linked in the above order. The event information included in the currently generated and newly inserted event notifying information to the terminal B of the terminal device information Y. When a "no-sheet" event occurs, event notifying information corresponding to the event is generated and inserted immediately before "event list end". In this event notifying information, a counter value "2" to indicate the number of pieces of the terminal device information "X for terminal A" and "Y for terminal B" is included (see FIG. 14C).

When the event information corresponding to the precedent cover-open event is provided to the terminal A, the terminal device information "X for terminal A" in the event notifying information for the cover-open event is passed to the following event notifying information, as shown in FIG. 4D, and the counter value in the event notifying information is decremented by one. Further, the MFP 1 notify the event information corresponding to the cover-close event to the terminal A.

Meanwhile, the event notifying information for the cover-open event, in which the counter value is now "zero" (see FIG. 14D), is deleted, by the MFP 1, from the status event list 13b (see FIG. 15A).

When the event information corresponding to the cover-close event, which occurred later than the cover-open event, is notified to the terminal A, the terminal device information "X for terminal A" in the event notifying information, of which notification of the event information has completed normally without failure, is passed to the event notifying information for the no-sheet event. The counter value in the event notifying information for the cover-close event is decremented by one.

Meanwhile, attempts to establish connection between the MFP 1 and the terminal B fail for predetermined times (e.g., twice), the terminal device information "Y for terminal B" is removed from the status event device list 13a1, and the counter value in the event notifying information for the cover-close event is decremented by one. Further, the counter value in the event notifying information for the no-sheet event is decremented by one. Then, as shown in FIG. 15C, the counter value in the event notifying information for the cover-close event is "zero", and the counter value in the event notifying information for the no-sheet event is "one". Then, the event notifying information for the cover-close event is removed from the status event list 13b1. When notification of the event information for the no-sheet event to the terminal A is completed, the terminal device information is removed from the event notifying information, and the counter value is "zero". It is noted that the terminal device information is removed from the event notifying information, because the event notifying information for the no-sheet event is not followed by another piece of event notifying information but followed by "event list end". Further, the event notifying information for the no-sheet event is removed from the status event list 13b1 (see FIG. 15D).

Although the present invention is explained based on the exemplary embodiment, It is to be understood easily that the invention needs not be limited to the configurations of the above-described embodiment, and can be improved/modified without departing the scope of the invention.

For example, in the above embodiment, from the subscribe request notified from the PC 31 to the MFP 1, information (e.g., ID information, URL information, validity period information (which is obtained as an actual time)) is extracted, and is stored, as terminal device information, in the device-to-be-notified list memory 13a. However, if the URL information in the subscribe request is a hostname, the hostname of the PC 31 can be converted into an IP address before it is stored as the terminal device information. If the MFP 1 and the PC 31 communicate with each other in TCP/IP, the hostname of the PC 31 can be converted into an IP address before notified so that the MFP 1 can generate the terminal device information based on the IP address. A hostname can be converted into an IP address when the MFP 1 makes an inquiry to a specific computer which is known as a DNS server. However, if the hostname is preliminarily converted into the IP address and stored, the notification of the event information can be conducted more efficiently in comparison with a case where the MFP 1 makes an inquiry every time the event information is notified.

In the above-described embodiment, the number of pieces of terminal device information to be included in the device-to-be-notified list memory 13a is not limited, but may be arbitrarily limited according to various factors such as processing capacity of the CPU 11 of the MFP 1 and data communication rate in the LAN 200. It is noted that, some terminal devices may not be notified of event information for some events due to the limitation, however, delay in notification of the event information to the other terminal devices that are allowed to be notified can be controlled. Specifically, as the number of the terminal devices to be notified is limited, the terminal device information of the PCs 31 which are not connected with the MFP 1 is removed so that the other PCs 31 which are communicable with the MFP 1 can be effectively notified of the event information.

In the above-described embodiment, when a plurality of events of the same type occur, the MFP 1 provides a plurality of pieces of respective events to the PCs (i.e., terminal devices A and B) in a chronological order. However, the MFP 1 may provide all the pieces of event information to the PCs (i.e., terminal devices A and B) in a chronological order, regardless the type of the events.

Furthermore, the event notifying information may be provided with terminal device information of all the terminal devices to which the event information is notified, and a pointer can be shifted each time notification is completed.

BRIEF DESCRIPTION OF THE ACCOMPANYING DRAWINGS

FIGS. 4A-4D show conceptual drawings schematically indicating contents of subscribe request and unsubscribe request.

FIGS. 5A-5B show tables indicating event types and events which can occur in the MFP.

FIGS. 14A-14D are conceptual drawings illustrating a flow of notifying device information inserted in the status event list.

DESCRIPTION OF REFERENCE NUMBERS

Figure 1:
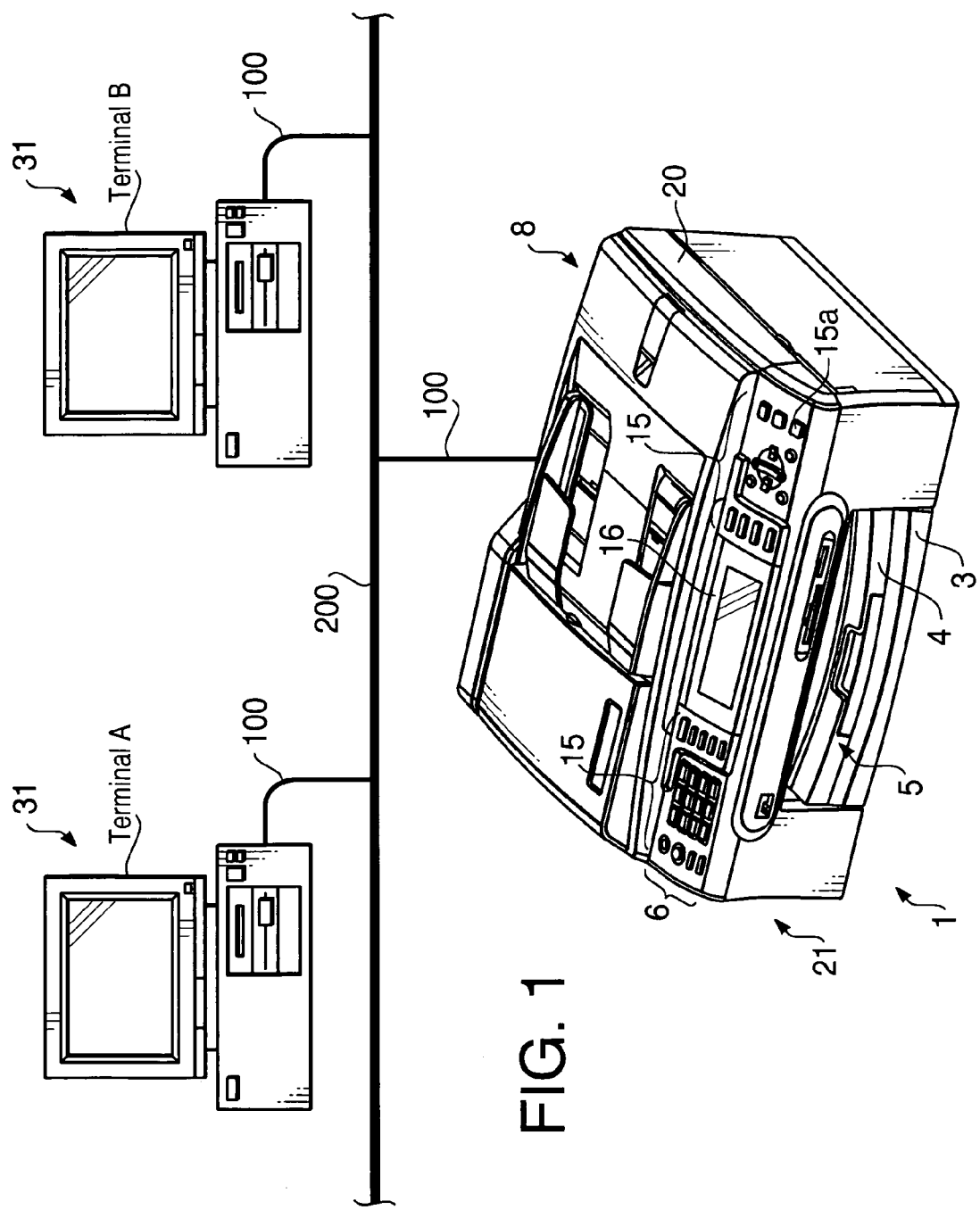
FIG. 1 is a perspective view showing appearance of an MFP (multi-function peripheral) and PCs (personal computers) according to an embodiment of the present invention.
Figure 2:
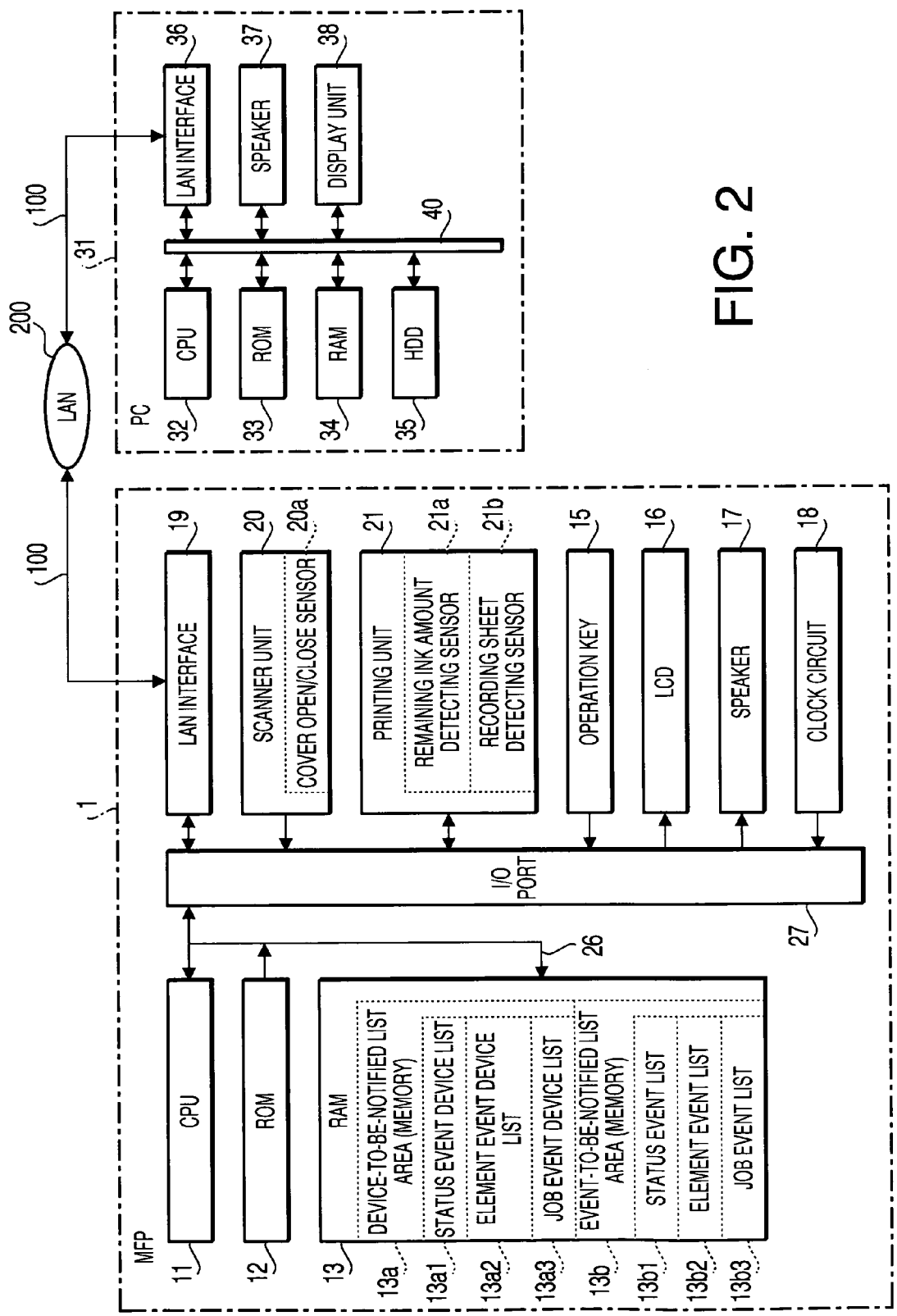
FIG. 2 is a block diagram to illustrate electrical configurations of the MFP and the PC.
Figure 3A:
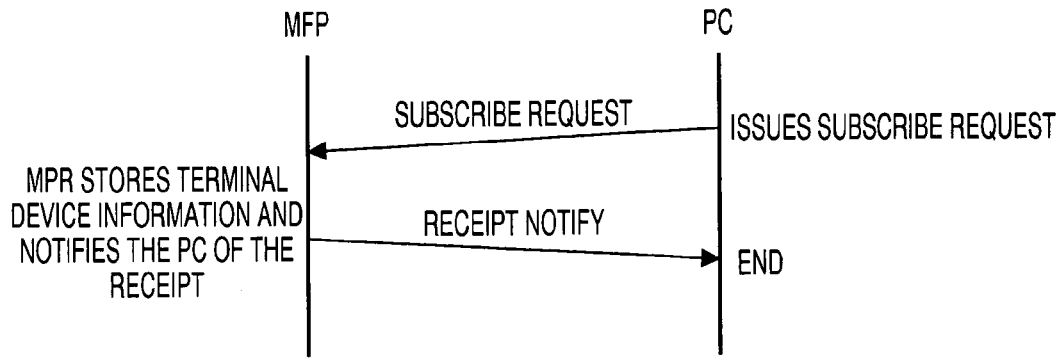
FIGS. 3A-3C show conceptual charts schematically illustrating data flows exchanged between the MFP and the PC.
Figure 3B:
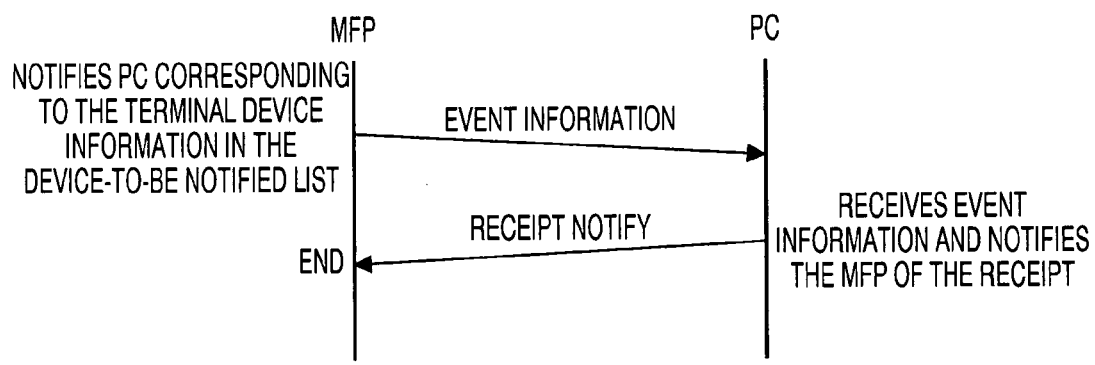
Figure 3C:
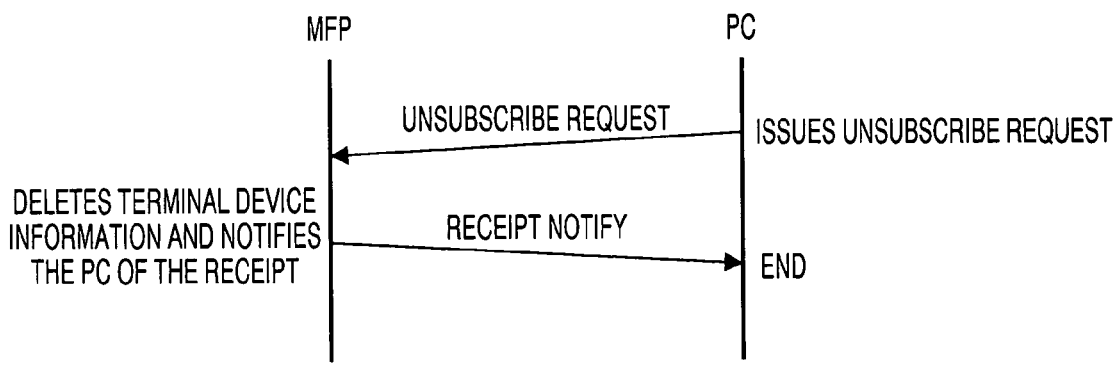
Figure 6A:
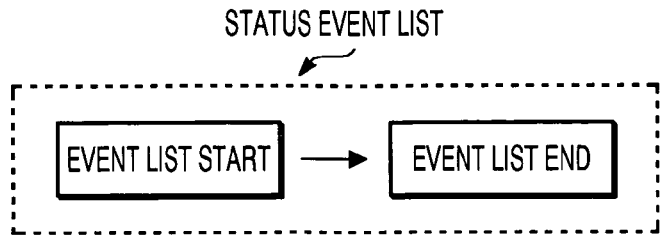
FIGS. 6A-6C are conceptual drawings illustrating an example of content of an event notifying list.
Figure 6B:
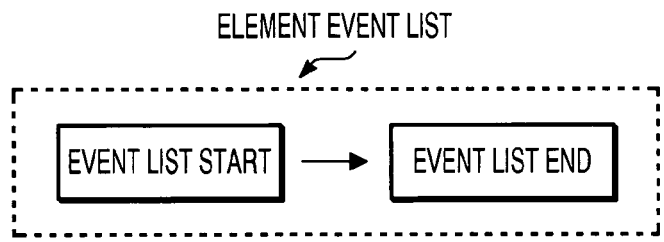
Figure 6C:
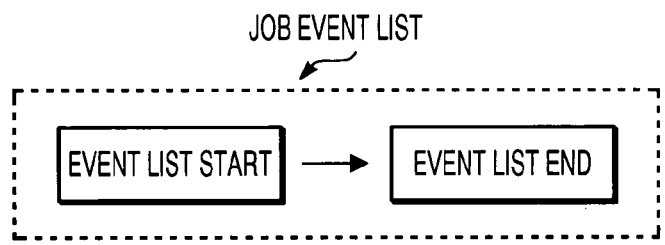
Figure 6D:
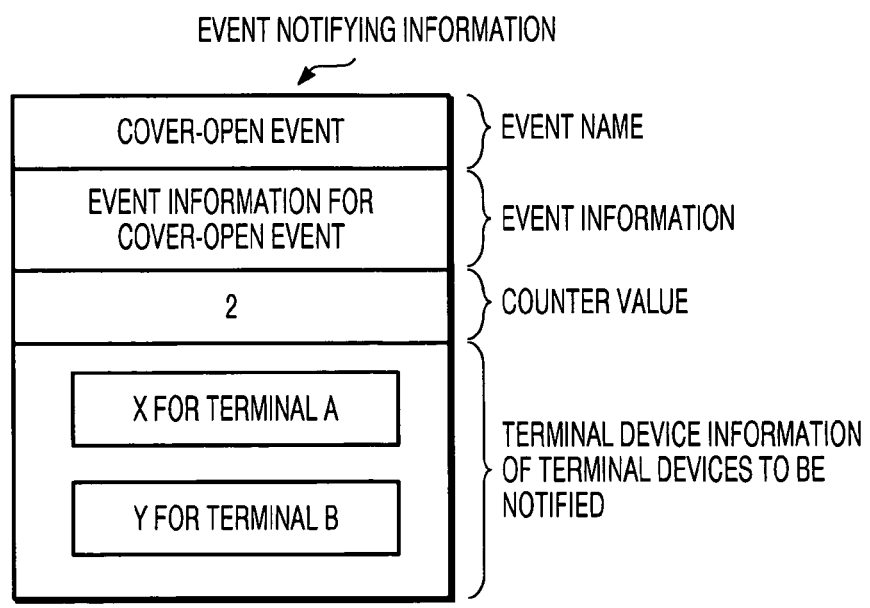
FIG. 6D is a conceptual drawing illustrating contents of event notifying information.
Figure 7:
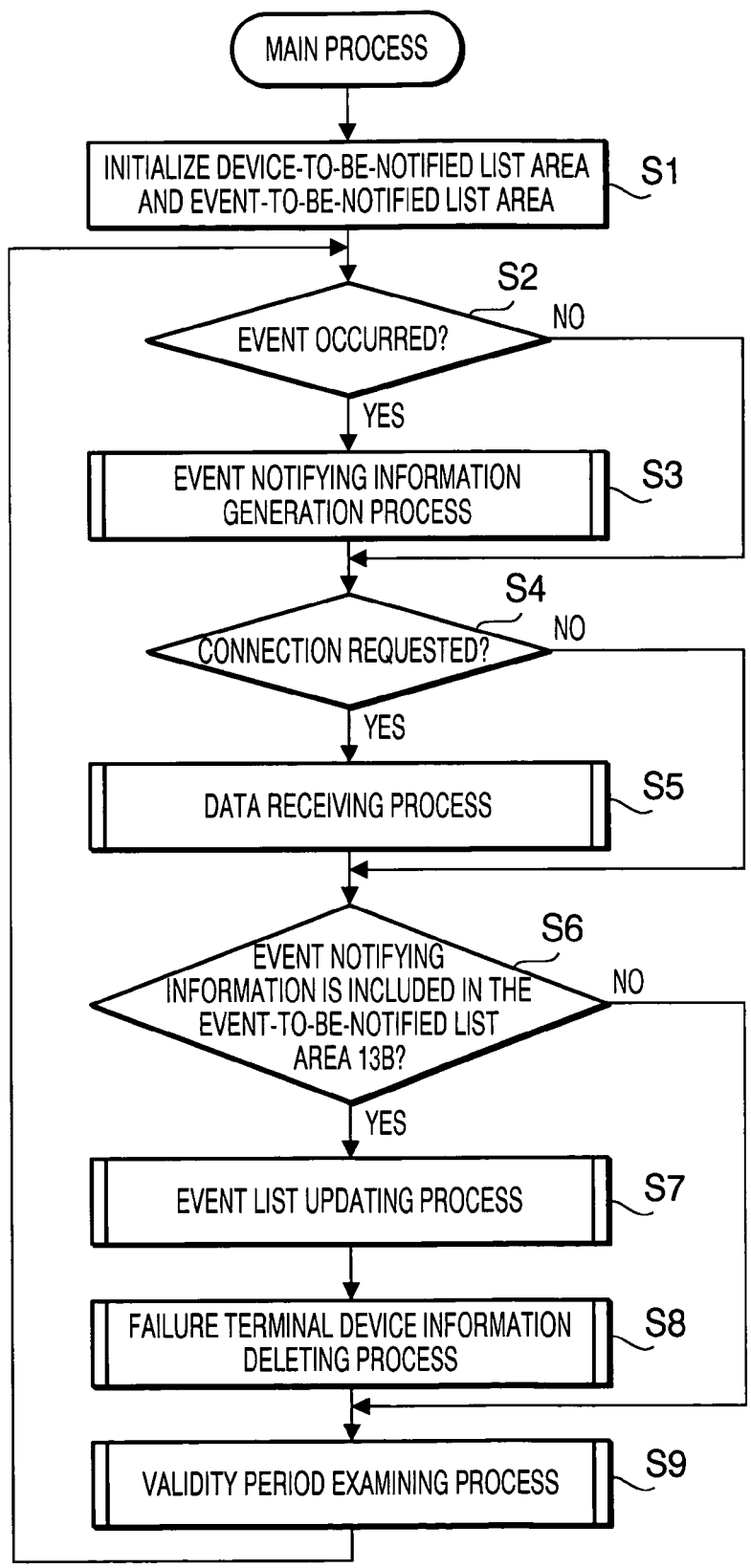
FIG. 7 is a flowchart to illustrate a main process of the MFP.
Figure 8:
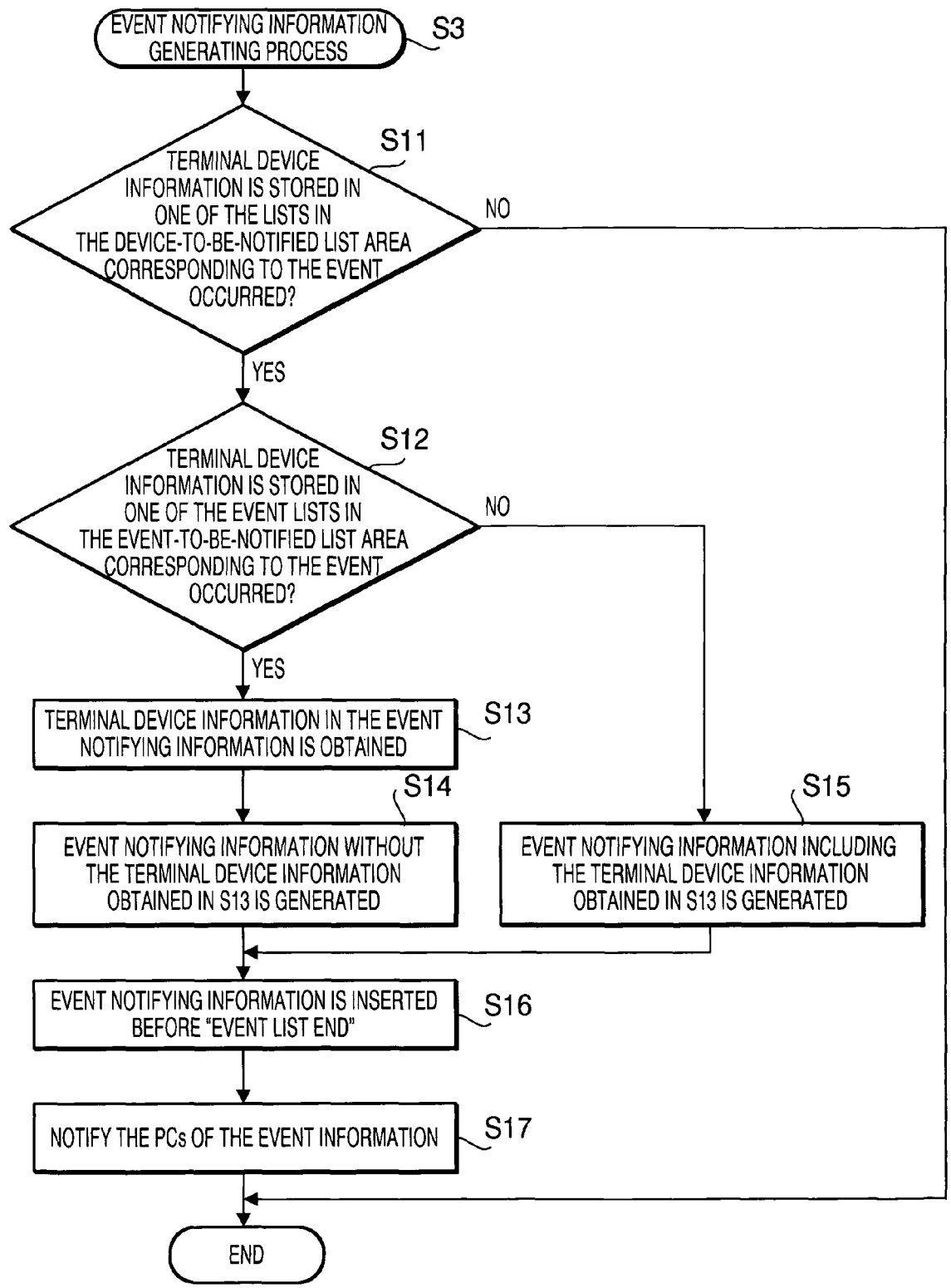
FIG. 8 is a flowchart to illustrate an event list addition process.
Figure 9:
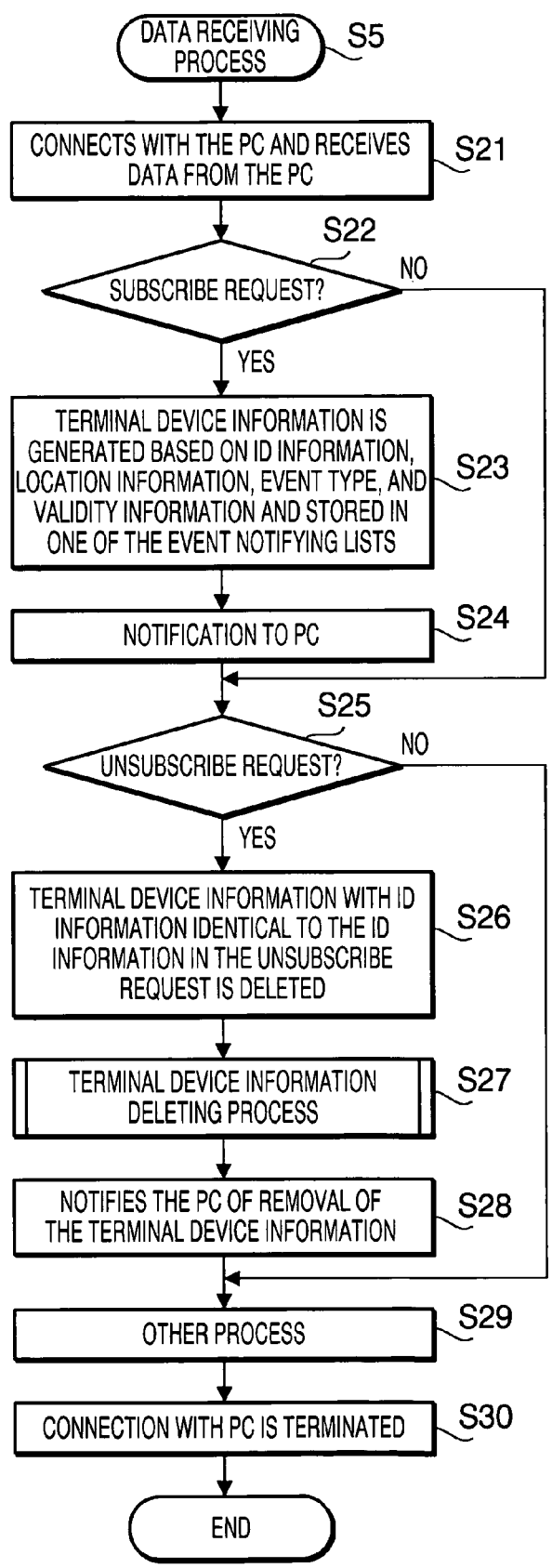
FIG. 9 is a flowchart of a data receiving process of the MFP.
Figure 10:
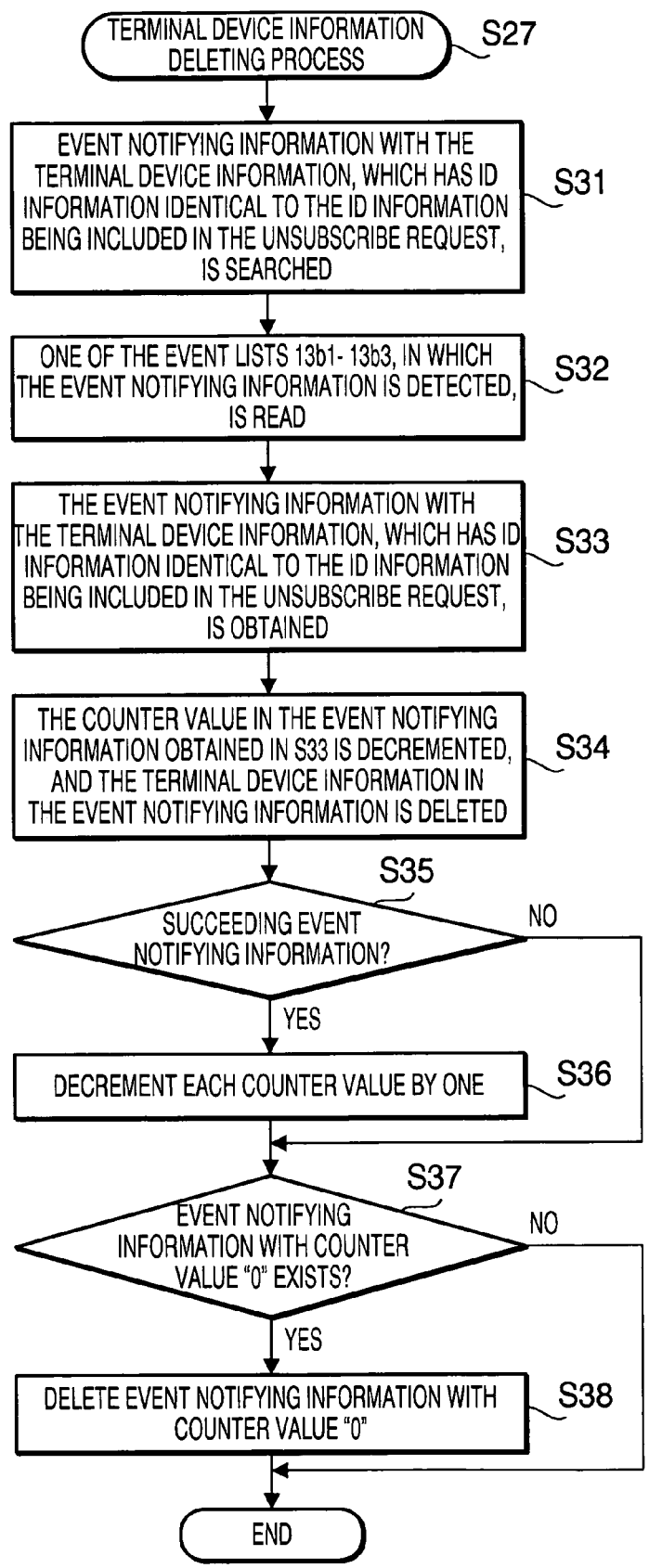
FIG. 10 is a flowchart of a terminal device information deleting process of the MFP.
Figure 11:
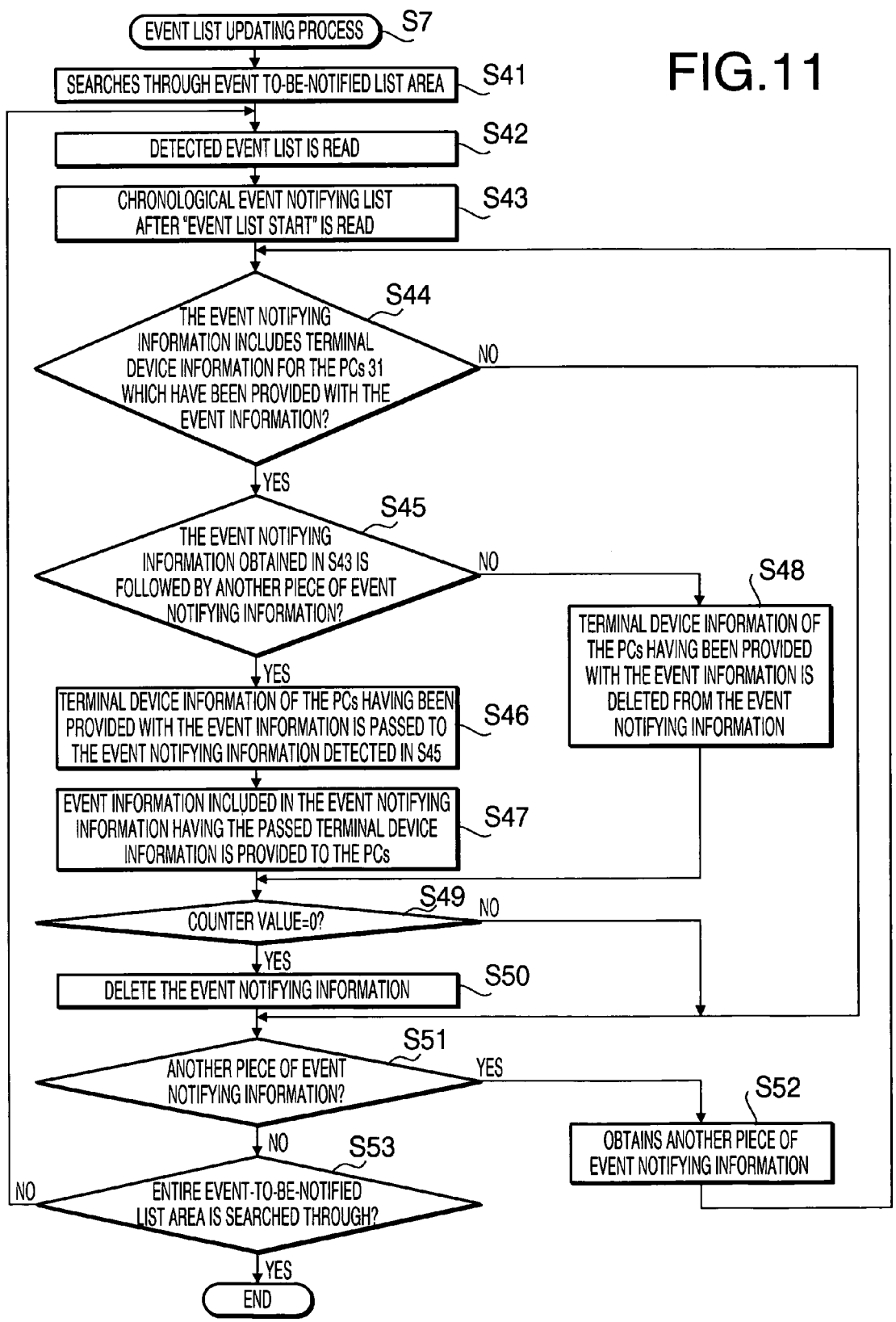
FIG. 11 is a flowchart of an event list updating process of the MFP.
Figure 12:
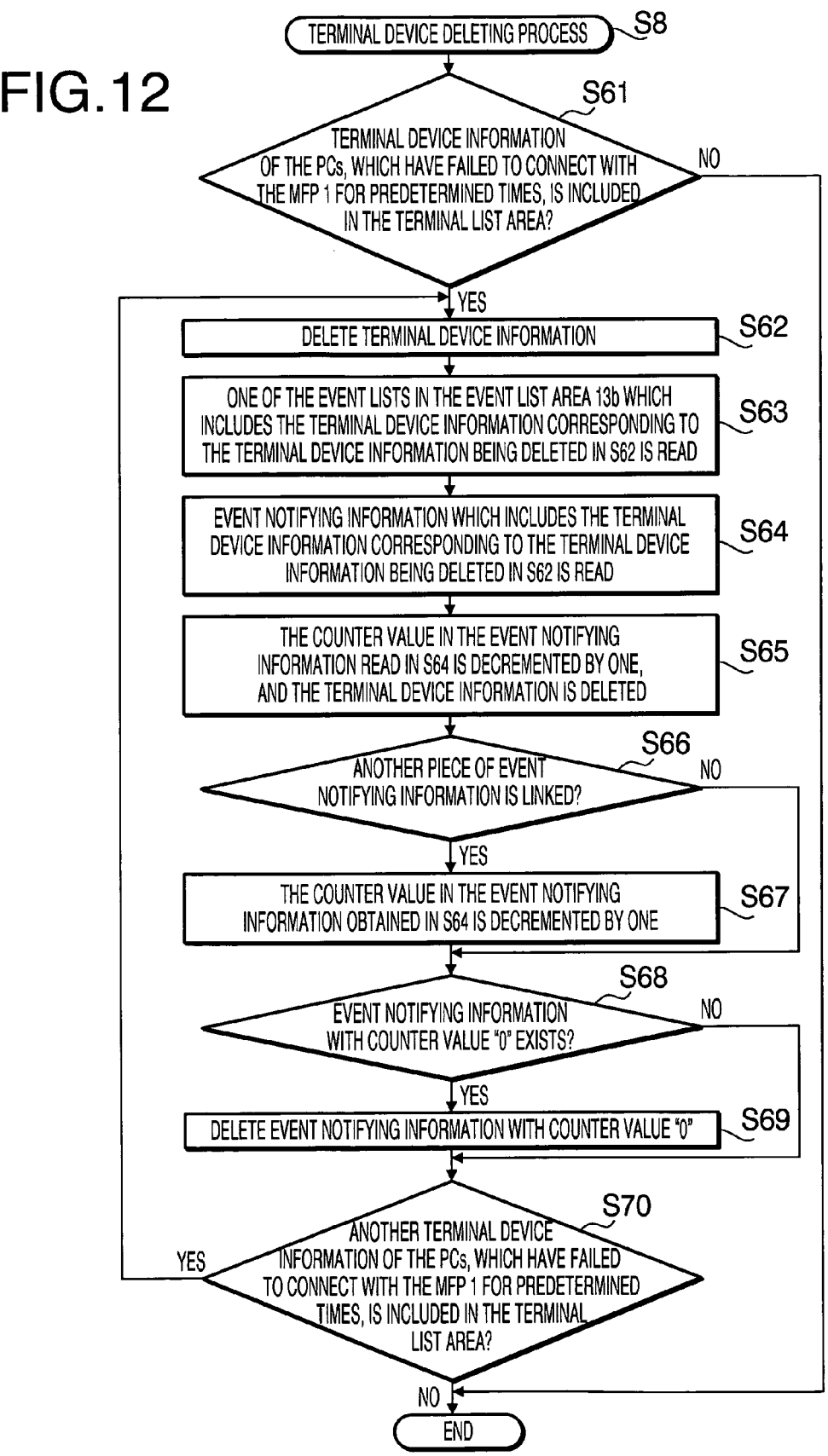
FIG. 12 is a flowchart of a failure terminal device information deleting process of the MFP.
Figure 13:
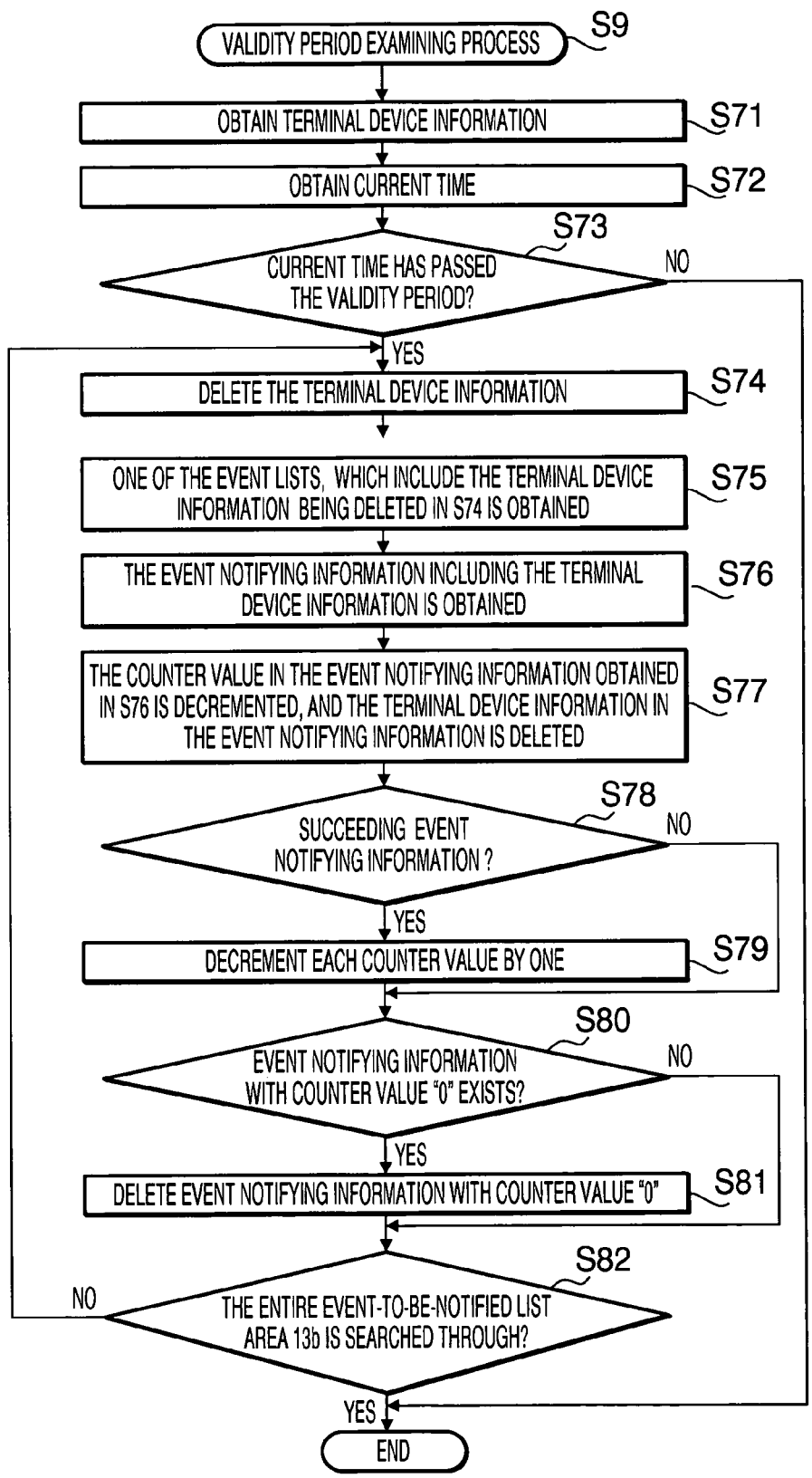
FIG. 13 is a flowchart of a validity period examining process of the MFP.
Figure 15A:
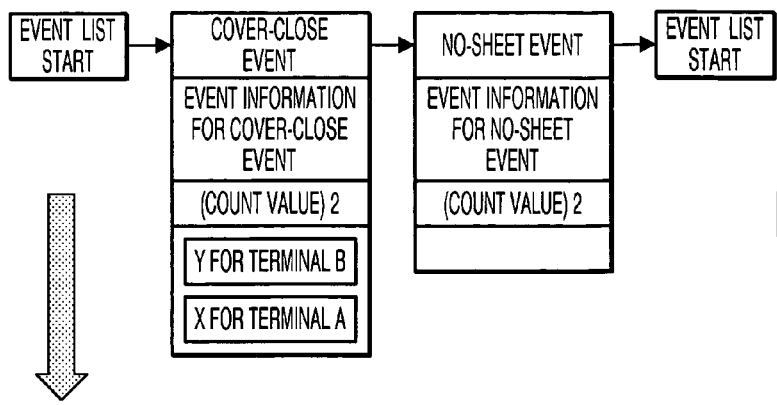
FIGS. 15A-15D are conceptual drawings illustrating a flow of notifying device data deleted from the status event list.
Figure 15B:
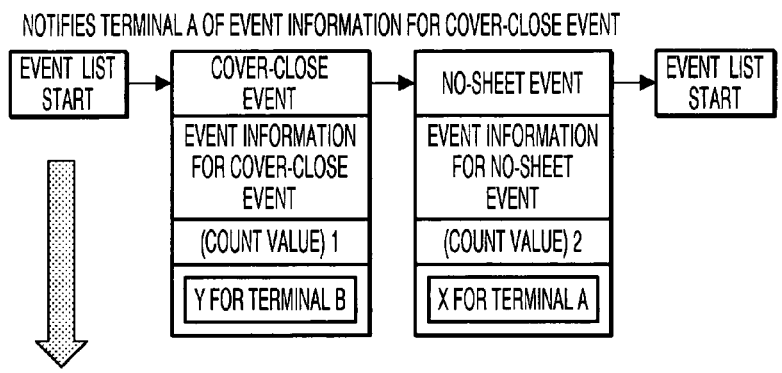
Figure 15C:
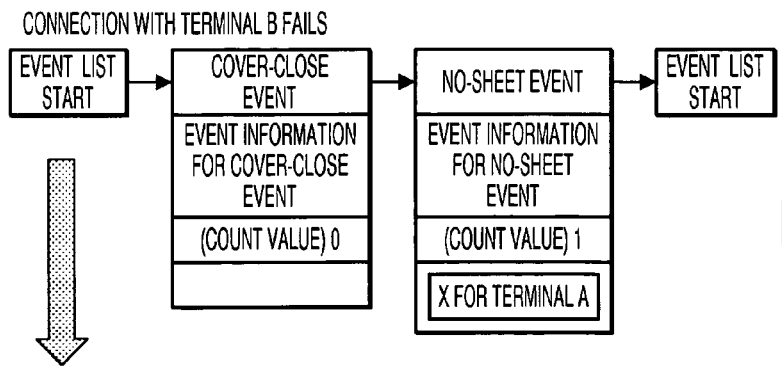
Figure 15D:
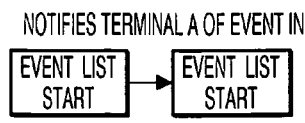

1 MFP (information processing device)
11 CPU (event detection means)
13a device-to-be-notified list memory
13b event-to-be-notified list memory
20a cover open/close sensor
21a remaining ink amount detecting sensor
21b recording sheet detecting sensor
S14, S15 event information generating means
S37, S38, S49, S50, S68, S69, S80, S81 event information deleting means
S44 judging means
S45, S46, S47 modifying means
S46 first subtracting means
S17 notifying means
S65 notified device deleting means
S65 second subtracting means
S66, S67 third subtracting means

The invention claimed is:

1. An information processing apparatus comprising:
a processor configured to, when executing computer readable instructions, provide:
an event detecting unit to detect events occurring in the information processing apparatus;
an event notifying information generating unit configured to generate event notifying information, which includes event information concerning each of the events and information concerning at least one client device to which the event information is provided;
an event notifying information storage unit configured to store the event notifying information in a predetermined arrangement so that the event information is provided to the at least one client device in chronological order in which the events occur according to the predetermined arrangement;
a client information storage unit configured to store information concerning a plurality of client devices to which the event notifying information is to be provided, the plurality of client devices including a first client device and a second client device;
a notifying unit configured to provide a piece of the event information corresponding to a first event among the plurality of events to the plurality of client devices including the first client device and the second client device; and
a judging unit configured to judge whether the piece of the event information was provided to the first client device successfully, and whether the piece of the event information was provided to the second client device successfully,
wherein if the judging unit judges that a piece of the event information corresponding to the first event was provided to the first client device successfully, the notifying unit provides a piece of the event information corresponding to the second event, which occurs subsequently to the first event, to the first client device even if a judging unit judges that notification of the piece of the event information corresponding to the first event to the second client device was failed.

2. The information processing apparatus according to claim 1, comprising:
a receiving unit configured to receive a notification request, issued by the at least one client device to request the information processing apparatus to provide the event information to the at least one client device; and
a requesting client device list storage unit configured to include client device information concerning the at least one client device which issued the notification request,
wherein the event notifying information generating unit includes the client device information being included in the requesting client device list storage unit to generate the event notifying information concerning the event occurring in the information processing apparatus so that the event information of the event is provided to the at least one client device according to the client device information included in the event notifying information, when the event detecting unit detects the event.

3. The information processing apparatus according to claim 2, comprising:
a cancellation receiving unit configured to receive a cancellation request, issued by the at least one client device to cancel the notification request so that the information processing apparatus ceases providing the event information to the at least one client device; and
a client information removing unit configured to remove the client device information of the at least one client device which issued the cancellation request from the requesting client device list storage unit and the event notifying information so that the event information of the event is prevented from being provided to the at least one client device which issued the cancellation request.

4. The information processing apparatus according to claim 1, wherein the event notifying information is stored in the event notifying information storage unit in the predetermined arrangement on the basis of an event type of the event occurring in the information processing apparatus.

5. The information processing apparatus according to claim 4, wherein the event notifying information includes a counter to indicate number of the at least one client device being stored in the client information list storage unit on the event type basis; and
wherein the information processing apparatus is provided with a first subtracting unit to subtract the number of the client device, which was provided with the event information normally from the number indicated in the counter, when the piece of the event information was provided to one of the at least one client device normally.

6. The information processing apparatus according to claim 5, comprising:
an event information deleting unit configured to delete the event notifying information, in which the number of the client device indicated in the counter is zero, from the event notifying information storage unit.

7. The information processing apparatus according to claim 1, comprising:
a client device information deleting unit configured to delete the client device information of the at least one client device, to which the piece of the event information was judged to be incapable of being provided, from the client information list storage unit and the event notifying information having the piece of the event information;

a second subtracting unit configured to subtract one from the number indicated in the counter in the event notifying information having the piece of the event information; and a third subtracting unit configured to subtract one from the number indicated in the counter in the event notifying information which is arranged, in the predetermined order in the event notifying information storage unit, to follow the event notifying information, of which event information is judged to be incapable of being provided.

8. The information processing apparatus according to claim 1, wherein the notifying unit is configured to provide a piece of event information to the plurality of client devices, respectively, the notifying unit notifies a piece of event information corresponding to a second event to the first client device when the judging unit judges that a piece of event information corresponding to a first event has been provided to the first client device successfully, the notifying unit not providing a piece of event information corresponding to the second event until the judging unit judges that the event information corresponding to the first event has been provided to the second client device normally, regardless whether the first client device executes notification of the piece of event information corresponding to the second event.

9. The information processing apparatus according to claim 1, wherein the notifying unit stops providing the event information corresponding to the first event and the event information corresponding to the second event to the second client device if it is judged that notification of the event information corresponding to the first event to the second client device was failed.

10. The information processing apparatus according to claim 1, further comprising a success notification receiving unit configured to receive success notification indicating that the event information corresponding to the first event has been received successfully from each of the plurality of client devices including the first client device and the second client device, wherein the judging unit judges that notification of the event information corresponding to the first event to the first client device is successful when the success notification receiving unit receives the success notification from the first client device, and wherein the judging unit judges that notification of the event information corresponding to the first event to the second client device is successful when the success notification receiving unit receives the success notification from the second client device.

11. A method to control an information processing apparatus capable of monitoring a plurality of events which occur in the information processing apparatus and providing event information concerning each of the events to at least one client device which is communicable with the information processing apparatus, comprising:

detecting an event occurring in the information processing apparatus;

generating event notifying information, which includes the event information and information concerning the at least one client device to which the event information is provided;

storing the event notifying information in a predetermined arrangement in an event notifying information storage unit so that the event information concerning each of the events is provided to the at least one client device in chronological order in which the events occur according to the predetermined arrangement;

storing information concerning a plurality of client devices to which the event notifying information is to be provided, the plurality of client devices including a first client device and a second client device;

providing a piece of the event information corresponding to a first event among the plurality of events to the plurality of client devices including the first client device and the second client device;

judging whether the piece of the event information was provided to the first client device successfully; and whether the piece of the event information was provided to the second client device successfully, wherein if it is judged that a piece of the event information corresponding to the first event was provided to the first client device successfully, providing a piece of the event information corresponding to a second event, which occurs subsequently to the first event, to the first client device even if it is judged that notification of the piece of the event information corresponding to the first event to the second client device was failed.

12. The method according to claim 11, comprising:

receiving a notification request, issued by the at least one client device to request the information processing apparatus to provide the event information to the at least one client device; and storing client device information concerning the at least one client device which issued the notification request in a requesting client device list storage unit; and including the client device information being stored in the requesting client device list storage unit to generate the event notifying information concerning the event occurring in the information processing apparatus so that the event information of the event is provided to the at least one client device according to the client device information included in the event notifying information, when the event is detected.

13. The method according to claim 12, comprising:

receiving a cancellation request, issued by the at least one client device to cancel the notification request so that the information processing apparatus ceases providing the event information to the at least one client device; and removing the client device information of the at least one client device which issued the cancellation request from the requesting client device list storage unit and the event notifying information so that the event information of the event is prevented from being provided to the at least one client device which issued the cancellation request.

14. The method according to claim 11, comprising:

storing the event notifying information in the event notifying information storage unit in the predetermined arrangement on the basis of an event type of the event occurring in the information processing apparatus.

15. The method according to claim 14, wherein the event notifying information includes a counter to indicate number of the at least one client device being stored in the client information list storage unit on the event type basis; and wherein the method includes subtracting the number of the client device which was provided with the event information normally from the number indicated in the counter when the piece of the event information was provided to one of the at least one client device normally.

16. The method according to claim 15, comprising:

deleting the event notifying information, in which the number of the client device indicated in the counter is zero, from the event notifying information storage unit.

17. The method according to claim 11, comprising:

deleting the client device information of the at least one client device, to which the piece of the event information was judged to be incapable of being provided, from the client information list storage unit and the event notifying information having the piece of the event information;

subtracting one from the number indicated in the counter in the event notifying information having the piece of the event information; and subtracting one from the number indicated in the counter in the event notifying information which is arranged, in the predetermined order in the event notifying information storage unit, to follow the event notifying information, of which event information is judged to be incapable of being provided.

18. The method according to claim 11, further comprising:

storing information related to the plurality of client devices including the first client device and the second client device in the client information list storage unit;

notifying a piece of event information corresponding to a second event to the first client device when the judging unit judges that a piece of event information corresponding to a first event has been provided to the first client device successfully using a notifying unit, the notifying unit being configured to provide a piece of event information to the plurality of client devices, respectively, wherein the notifying unit not providing a piece of event information corresponding to the second event until the judging unit judges that the event information corresponding to the first event has been provided to the second client device normally, regardless whether the first client device executes notification of the piece of event information corresponding to the second event.

19. A computer readable storage device comprising computer readable instructions for controlling a computer to monitor a plurality of events which occur in an information processing apparatus and provide event information concerning each of the events to at least one client device which is communicable with the information processing apparatus by executing steps of:

detecting an event occurring in the information processing apparatus;

generating event notifying information, which includes the event information and information concerning the at least one client device to which the event information is provided;

storing the event notifying information in a predetermined arrangement in an event notifying information storage unit so that the event information concerning each of the events is provided to the at least one client device in chronological order in which the events occur according to the predetermined arrangement;

storing information concerning a plurality of client devices to which the event notifying information is to be provided, the plurality of client devices including a first client device and a second client device;

providing a piece of the event information corresponding to a first event among the plurality of events to the plurality of client devices including the first client device and the second client device;

judging whether the piece of the event information was provided to the first client device successfully; and whether the piece of the event information was provided to the second client device successfully, wherein if it is judged that a piece of the event information corresponding to the first event was provided to the first client device successfully, providing a piece of the event information corresponding to the second event, which occurs subsequently to the first event, to the first client device even if it is judged that providing the piece of the event information corresponding to the first event to the second client device was failed.

* * * * *